(12) United States Patent
Jin et al.

(10) Patent No.: US 7,670,509 B2
(45) Date of Patent: Mar. 2, 2010

(54) COMPOSITE NANOFIBER, COMPOSITE NANOFIBER ASSOCIATION, COMPLEX STRUCTURE, AND PRODUCTION METHOD THEREOF

(75) Inventors: Ren-Hua Jin, Tokyo (JP); Jian-Jun Yuan, Sakura (JP)

(73) Assignee: Kawamura Institute of Chemical Research, Sakura-shi (JP)

( * ) Notice: Subject to any disclaimer, the term of this patent is extended or adjusted under 35 U.S.C. 154(b) by 450 days.

(21) Appl. No.: 11/569,300

(22) PCT Filed: May 27, 2005

(86) PCT No.: PCT/JP2005/009769
§ 371 (c)(1),
(2), (4) Date: Nov. 17, 2006

(87) PCT Pub. No.: WO2005/116140
PCT Pub. Date: Dec. 8, 2005

(65) Prior Publication Data
US 2007/0197708 A1 Aug. 23, 2007

(30) Foreign Application Priority Data
May 31, 2004 (JP) ............................ 2004-161234
Aug. 24, 2004 (JP) ............................ 2004-243580

(51) Int. Cl.
*H01B 1/00* (2006.01)
(52) U.S. Cl. ...................... 252/500; 423/38; 427/407.1; 428/171; 428/549; 428/569; 428/607; 442/167; 524/439
(58) Field of Classification Search ................. 252/500; 427/407.1; 428/171, 549, 569, 607; 423/338; 442/167; 524/439
See application file for complete search history.

(56) References Cited

U.S. PATENT DOCUMENTS
6,054,507 A 4/2000 Funaki et al.

(Continued)

FOREIGN PATENT DOCUMENTS
JP 11-060890 A 3/1999

(Continued)

OTHER PUBLICATIONS

B. Ding et al., "Morphology and crystalline phase study of electrospun TiO2-SiO2 nanofibres", Nanotechnology, vol. 14, Mar. 31, 2003, pp. 532-537.*

(Continued)

*Primary Examiner*—Mark Kopec
*Assistant Examiner*—Khanh Tuan Nguyen
(74) *Attorney, Agent, or Firm*—Darby & Darby P.C.

(57) ABSTRACT

A silica nanofiber is derived from a crystalline polymer filament of a polymer including straight chain polyethyleneimine backbones, which is capable of forming a water-insoluble crystal in the presence of water molecules at room temperature, and the crystalline polymer filament in the silica concentrates metal ions, thereby realizing a composite nanofiber including metals or metal ions in the silica. Furthermore, the composite nanofiber of the present invention can be easily produced by fixing a polymer structure in the silica as the scaffold for metal ions and concentrating metal ions at the scaffold or reducing the metal ions. Furthermore, a metal-containing silica nanofiber can be easily obtained by removing a polymer component from the composite nanofiber, the composite nanofiber association, and the complex nanofiber structure. These nanofibers can be assembled and integrated, and the assembled or integrated association or structure can realize various shapes.

22 Claims, 3 Drawing Sheets

U.S. PATENT DOCUMENTS

2003/0044339 A1* 3/2003 Barbeau ................. 423/338
2004/0224590 A1* 11/2004 Rawa et al. ............. 442/176

FOREIGN PATENT DOCUMENTS

JP         2004-034617 A       2/2004
WO      WO 01/27368 A1  *  4/2001

OTHER PUBLICATIONS

D. Li et al., "Electrospinning of Nanofibers: Reinventing the Wheel?**'", Adv. Mater., Jul. 19, 2004, vol. 16, No. 14, pp. 1151-1170.*

S. Sato et al., "Control of pore size distribution of silica gel through sol-gel process using water soluble polymers as additives", Journal of Materials Science, 1990, vol. 25, pp. 4880-4885.*

B. Lee, et al., Synthesis and Characterization of Organic-Inorganic Hybrid Mesoporous Anion-Exchange Resins for Perrhenate ($ReO_4^-$) Anion Adsorption, Langmuir 2003, 19, pp. 4246-4252.

G. Hornyak, et al., Gold Clusters and Colloids in Alumina Nanotubes, Chem. Eur. J., 1997, 3, No. 12, pp. 1951-1956.

Yong-Jin Han, et al., Preparation of Noble Metal Nanowires Using Hexagonal Mesoporous Silica SBA-15, Chem. Master., 2000, 12, pp. 2068-2069.

V. G. Pol, et al., Deposition of Gold Nanoparticles on Silica Spheres: A Sonochemical Approach, Chem. Master., 2003, 15, pp. 1111-1118.

Y. Chatani, et al., Structural Studies of Poly(ethylenimine). 1. Structures of Two Hydrates of Poly(ethylenimine) : Sesquihydrate and Dihydrate, Macromolecules, 1981, 14, pp. 315-321.

Isabel Diaz, et al., Structural Study by Transmission and Scanning Election Microscopy of the Time-dependent Structural Change in M41S Mesoporous Silica (MCM-41 to MCM-48, and MCM-50), J. Master. Chem., 2004, 14, pp. 48-53.

Ren-Hua Jin, et al., Porphyrin-centered Water-soluble Star-shaped Polymers: Poly(N-acetylethylenimine) and Poly(ethylenimine) Arms, Journal of Porphyrins and Phthalocyanines, 3, pp. 60-64 (1999).

Ren-Hua Jin, Self-Assembly of Porphyrin-Centered Amphiphilic Star Block Copolymer into Polymeric Vesicular Aggregates, Macromol. Chem. Phys., 2003, 204, pp. 403-409.

Ren-Hua Jin, Colloidal Crystalline Polymer Generated in Situ from Growing Star Poly(oxazolines), J. Master. Chem., 2003, 13, pp. 672-675.

* cited by examiner

COMPOSITE NANOFIBER, COMPOSITE NANOFIBER ASSOCIATION, COMPLEX STRUCTURE, AND PRODUCTION METHOD THEREOF

TECHNICAL FIELD

The present invention relates to a nanofiber including metals or metal ions in a silica nanofiber, an association or structure obtained by assembling the nanofiber, and a method for producing the nanofiber and the nanofiber association.

This application claims priority on Japanese Patent Application No. 2004-161234 filed on May 31, 2004 and Japanese Patent Application No. 2004-243580 filed on Aug. 24, 2004, the disclosure of which is incorporated by reference herein.

BACKGROUND ART

It is known that materials having a nano-size structure exhibit characteristics which are different from those of a bulk state. Among these materials, a nanofiber having a nanometer thickness and a length, which is several tens times greater than the thickness, exerts the size effect peculiar to a fiber shape because of its high aspect ratio, and therefore an intense interest has been shown towards the nanofiber as one of advanced materials. A silica nanofiber has a high aspect ratio and a large surface area peculiar to the nanofiber and also has various physical properties such as semiconductor characteristics, conductivity, surface physical properties and mechanical strength peculiar to an inorganic material, and therefore it is expected to be widely applied in various fields of advanced materials including electronic materials and biology & life sciences. It is also expected that applications of the silica nanofiber are remarkably increased by assembling a nanofiber (one-dimensional) thereby forming a fabric-shaped (two-dimensional) or massive (three-dimensional) structure as a structure while maintaining characteristics of the nanofiber.

Particularly, materials obtained by combining a silica nanofiber with the other functional material such as inorganic material or organic material have wide applicability and it is expected that materials obtained by combining the silica nanofiber with the inorganic material such as metals are widely applied in various fields of electronic materials, optical materials, catalysts, coloring materials and sensors.

As materials obtained by combining silica with metals or metal ions, for example, a composite material produced by fixing a metal complex to a mesoporous silica is used in chemical reaction catalysts, electrochemical sensors, and solid polymer electrolytes. When a complex produced by introducing a metal complex into a mesoporous silica is applied, since various merits such as high surface area of the silica surface, uniform distribution of a complex active site in a nanocavity, rapid diffusion of a substrate compound, and heat resistance and acid resistance of a catalyst carrier are expected, an intense interest has been shown towards a metal complex fixation technique in which a mesoporous silica is used as a carrier (see Non-patent reference 1).

However, the silica used as a conventional composite material of the metal complex and the silica was limited to a bulk powder or a particle state of the silica. Therefore, since the complex fine particles have a particle shape in which an aspect ratio is about 1:1, only the complex fine particles cannot be assembled or integrated, and thus it was difficult to form a structure in which properties peculiar to a nano structure material are maintained.

Also, the production method requires the step of introducing an amino or imino group for coordinate bonding of metal ions into silica backbones through a chemical bond, and the step was complicated.

Various studies have been made on the fine composite material of the silica and the metal, for example, a complex of mesoporous silica/metal nanowire produced by reducing a metal ion solution in a channel of a mesoporous silica of MCM-41 series (see Non-patent reference 2, and Non-patent reference 3) and a complex of silica fine particles/metal nanoparticles produced by bonding metal ions in silica fine particles (see Non-patent reference 4).

However, in a complex of a conventional metal nanoparticle/nanowire and the other material, it is difficult to form a metal nanoparticle or a nanowire unless the fixed space of a material having a fixed shape. Therefore, the shape of the silica has low degree of freedom, and the silica is limited to a bulky silica having pores which form a wire or silica having a particle shape, and it was difficult to control the shape of the complex. Consequently, it was difficult to highly integrate the complex or the metal nanowire included therein.

[Non-patent reference 1]
B. Lee et al., Langmuir, (2003), 19, p 4246-4252
[Non-patent reference 2]
G. Hornyak et al., Chem. Eur. J. 1997, 3, No. 12, p 1951-1956
[Non-patent reference 3]
Yong-Jin Han, Chem. Mater., 2000, 12, p 2068-2069
[Non-patent reference 4]
V. G. Pol et al., Chem. Mater., 2003, 15, p 1111-1118

DISCLOSURE OF THE INVENTION

An object to be achieved by the present invention is to provide a metal-containing silica nanofiber which includes ions or atoms of metals fixed in the structure and also can be highly assembled, a composite nanofiber in which a functional polymer is further complexed with the metal-containing silica nanofiber, an association or a structure in which these nanofibers are highly assembled, and a simple production method thereof.

In the present invention, a silica nanofiber is derived from a crystalline polymer filament of a polymer including straight chain polyethyleneimine backbones, which is capable of forming a water-insoluble crystal in the presence of water molecules at room temperature, and the crystalline polymer filament in the silica concentrates metal ions, thereby realizing a composite nanofiber including metals or metal ions in the silica. The composite nanofiber can be assembled or integrated, and an association produced by assembling or integrating the composite nanofiber can exert various shapes. Furthermore, the composite nanofiber of the present invention can be easily produced by fixing a polymer structure in the silica as the scaffold for metal ions and concentrating metal ions at the scaffold or reducing the metal ions. Furthermore, a metal-containing silica nanofiber can be easily obtained by removing a polymer component from the composite nanofiber, the composite nanofiber association, and the composite nanofiber structure.

The present invention provides a composite nanofiber including at least one kind of metals or metal ions and a polymer including straight chain polyethyleneimine backbones in a silica nanofiber, an association in which the composite nanofibers are associated with each other, and a complex structure in which the associations are further associated with each other. In the present invention, it is preferable that at least one kind of metals or metal ions and the polymer including the straight chain polyethyleneimine backbones be coordinatively bonded.

Also, the present invention provides a metal-containing silica nanofiber, a metal-containing silica nanofiber association, and a metal-containing silica nanofiber structure, in which a polymer component is removed from the composite nanofiber, the composite nanofiber association, and the complex structure.

Furthermore, the present invention provides a method for producing a composite nanofiber, including (1) dissolving a polymer including straight chain polyethyleneimine backbones in a solvent, and precipitating the polymer in the presence of water to obtain a crystalline polymer filament of the polymer including the straight chain polyethyleneimine backbones, (2) bringing the crystalline polymer filament into contact with an alkoxysilane in the presence of water, thereby coating the crystalline polymer filament with silica to obtain a polymer-containing silica nanofiber, and (3) bringing the polymer-containing silica nanofiber into contact with a solution in which metal ions are dissolved, thereby coordinatively bonding the metal ions to the straight chain polyethyleneimine backbones in the polymer; and a method for producing a composite nanofiber, further including the step (4) of reducing transition metal ions coordinatively bonded to the straight chain polyethyleneimine backbones in the polymer after the above steps.

Furthermore, the present invention provides a method for producing a metal-containing silica nanofiber, further including the step (5) of removing a polymer component in the composite nanofiber after obtaining the composite nanofiber by the above steps.

The composite nanofibers and metal-containing silica nanofibers of the present invention can be highly assembled or integrated by associating with each other, thereby forming an association having a two-dimensional or three-dimensional spatial shape of micrometer or millimeter order. The association shape can be adjusted to various shapes such as lettuce, fiber, sponge, aster, cactus, and dandelion. Furthermore, a structure having a macro external shape of millimeter order or more can be formed by bonding the composite nanofiber associations with each other or bonding the association through the other composite nanofiber. It is possible to form a structure having any external shape such as disk, column, plate, filter, membrane, sphere, or rod according to specific application requirements, and it is possible to form various states such powder, particle, polyhedron, and cylinder. In the structure, an association shape of the association exists, and the association is based on the composite nanofiber or the metal-containing silica nanofiber of the present invention. Therefore, the structure has a three-dimensional network structure which is complicatedly formed by these nanofibers.

Furthermore, the composite nanofiber and the metal-containing silica nanofiber of the present invention include metal ions or metals therein. Since metal ions include ions of alkali metals, alkali earth metals, and transition metals, these nanofiber can be expected to be applied to solid electrolytes, solid catalysts, nanoadditives, and nano thin film materials.

Also, a metal ion are converted into a metal having a particle shape or a wire shape via a metal cluster by spontaneous reduction of metal ion, or reducing metal ion through a heat treatment or a reducing agent. Consequently, it is possible to give a film-shaped structure made of nanofibers including metal nanowires, a sponge-shaped structure made of nanofibers including metal nanowires, and a network structure made of nanofibers including metal nanowires. It is also possible to distribute metal nanoparticles in complex structures having these shapes.

Among these nanofibers, a silica nanofiber including crystals of a transition metal, particularly a noble metal is highly useful and can be expected to be widely used in the overall fields of nano-technologies, for example, nanometal catalysts, nanometal conductive materials, nanometal color materials, nanometal sensors, optical image materials, photoelectronical materials, and medical materials.

According to the production method of the present invention, the composite nanofiber can be easily produced within a short time by the following procedure. That is, by the sol-gel reaction of a silica source, which proceeds only on the surface of a crystalline polymer filament having a nanometer thickness, the crystalline polymer filament is coated with silica having a fixed thickness, and then metal ions are fixed, and, if necessary, the metal ions are reduced.

Furthermore, since a polymer component in the composite nanofiber of the present invention can be easily removed by sintering, a metal-containing silica nanofiber including metal nanoparticles or metal nanowires therein is easily produced.

BEST MODE FOR CARRYING OUT THE INVENTION

Figure 1:
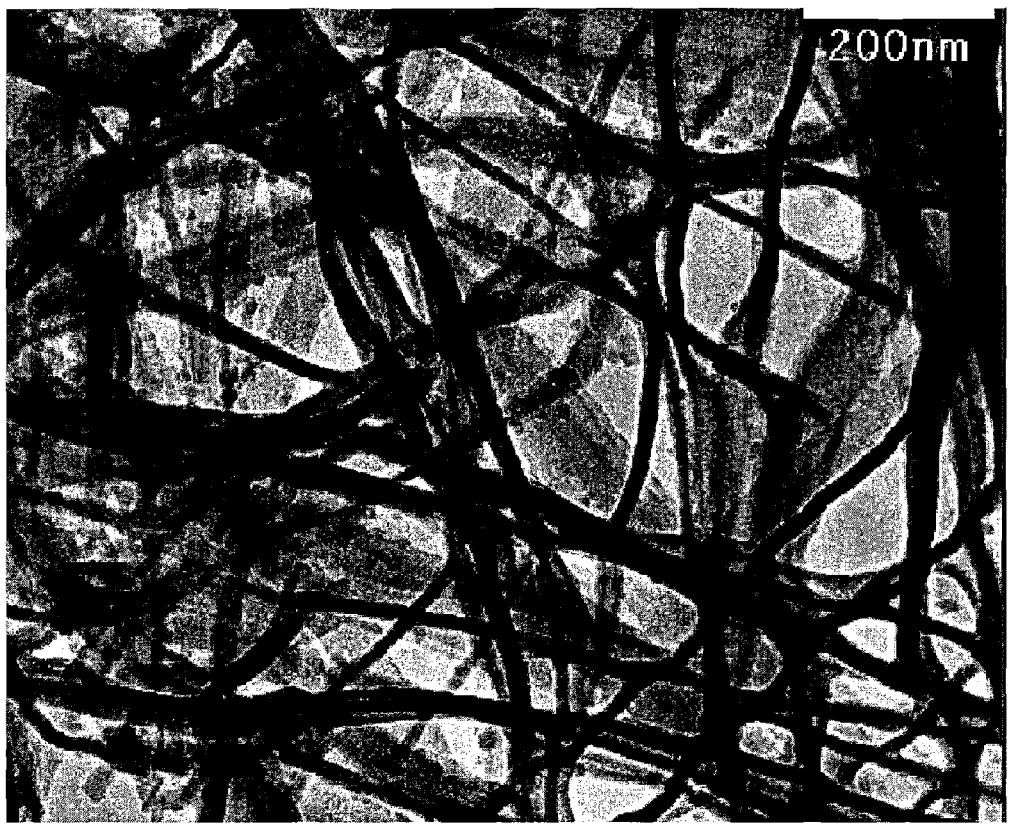
FIG. 1 is a transmission electron micrograph of a composite nanofiber structure in Example 1 of the present invention.

The composite nanofiber of the present invention is a composite material in which metals or metal ions, and a polymer including straight chain polyethyleneimine backbones are included in a silica nanofiber.

[Polymer including Straight Chain Polyethyleneimine Backbones]

Straight chain polyethyleneimine backbones in the present invention mean straight chain polymer backbones having an ethyleneimine unit of a secondary amine as a main structural unit. In the backbones, a structural unit other than the ethyleneimine unit may exist. However, in order to form a crystalline polymer filament, the backbones preferably include an ethyleneimine unit in which a fixed chain length of a polymer chain is continuous. The length of the straight chain polyethyleneimine backbones is not specifically limited as long as a polymer including the backbones can form a crystalline polymer filament. In order to suitably from a crystalline polymer filament, the number of ethyleneimine repeating units of the backbone moiety is preferably 10 or more, and particularly preferably within a range from 20 to 10,000.

The polymer used in the present invention may have the straight chain polyethyleneimine backbones in the structure, and the configuration may be a linear, star-shaped, or comb-shaped configuration as long as it can give a crystalline polymer filament in the presence of water.

The linear, star-shaped, or comb-shaped polymer may be composed only of straight chain polyethyleneimine backbones, or may be composed of a block copolymer of a block of straight chain polyethyleneimine backbones (hereinafter abbreviated to a polyethyleneimine block) and the other polymer block. As the other polymer block, for example, a water-soluble polymer block such as polyethylene glycol, polypropionylethyleneimine, or polyacrylamide; or a hydrophobic polymer block such as polystyrene, polyoxazolines including polyphenyloxazoline, polyoctyloxazoline, and polydodecyloxazoline, or polyacrylates including polymethyl methacrylate and polybutyl methacrylate can be used. The shape or characterstics of the crystalline polymer filament can be adjusted by forming a block copolymer with these polymer blocks.

When the polymer including straight chain polyethyleneimine backbones has the other copolymer block, the content of the straight chain polyethyleneimine backbones in the polymer is not specifically limited as long as a crystalline polymer filament can be formed. In order to suitably form a crystalline polymer filament, the content of the straight chain polyethyleneimine backbones in the polymer is preferably 25 mol % or more, more preferably 40 mol % or more, and still more preferably 50 mol % or more.

The polymer including straight chain polyethyleneimine backbones can be easily obtained by hydrolyzing a polymer including straight chain backbones made of polyoxazolines as a precursor (hereinafter abbreviated to a precursor polymer) under acid conditions or alkali conditions. Therefore, a linear, star-shaped, or comb-shaped configuration of the polymer including straight chain polyethyleneimine backbones can be easily designed by controlling the shape of the precursor polymer. Also the polymerization degree and the end structure can be easily adjusted by controlling the polymerization degree or the end function group of the precursor polymer. Furthermore, when a block copolymer including straight chain polyethyleneimine backbones is formed, it can be obtained by using a precursor polymer as a block copolymer and selectively hydrolyzing straight chain backbones made of polyoxazolines in the precursor.

The precursor polymer can be synthesized by cationic polymerization method, or a synthesis method such as macromonomer method using a monomer of oxazolines, and precursor polymers having various configuration such as a linear, star-shaped, or comb-shaped configuration can be synthesized by appropriately selecting a synthesis method or an initiator.

As the monomer which forms straight chain backbones made of polyoxazolines, for example, an oxazoline monomer such as methyloxazoline, ethyloxazoline, methylvinyloxazoline, or phenyloxazoline can be used.

As the polymerization initiator, for example, a compound having a functional group such as alkyl chloride group, alkyl bromide group, alkyl iodide group, toluenesulfonyloxy group, or trifluoromethylsulfonyloxy group in the molecule can be used. These polymerization initiators can be obtained by converting hydroxyl groups of a lot of alcohol compounds into other functional groups. Those, which are brominated, iodided, toluenesulfonated and trifluoromethylsulfonated by conversion into the functional group, are preferable because of high polymerization initiation efficiency, and alkyl bromide and alkyl toluenesulfonate are particularly preferable.

Those obtained by converting a terminal hydroxyl group of poly(ethylene glycol) into bromine, iodine, or a toluenesulfonyl group can also be used as the polymerization initiator. In that case, the polymerization degree of poly(ethylene glycol) is preferably within a range from 5 to 100, and particularly preferably from 10 to 50.

Also, pigments, which include a functional group having a cationic ring-opening living polymerization initiation ability and also include any of porphyrin backbones, phthalocyanine backbones and pyrene backbones, each having a light-inducing light emitting function, energy transfer function, or electron transfer function, can impart a special function to the resulting polymer.

The linear precursor polymer is obtained by polymerizing the oxazoline monomer using a polymerization initiator having a monovalent or divalent functional group. Examples of the polymerization initiator include a polymerization initiator having a monovalent functional group such as methylbenzene chloride, methylbenzene bromide, methylbenzene iodide, methylbenzene toluenesulfonate, methylbenzene trifluoromethylsulfonate, methane bromide, methane iodide, methane toluenesulfonate or toluenesulfonic anhydride, trifluoromethylsulfonic anhydride, 5-(4-bromomethylphenyl)-10,15, 20-tri(phenyl)porphyrin, or bromomethylpyrene; and a polymerization initiator having a divalent functional group such as dibromomethylbenzene, methylbenzene diiodide, dibromomethylbiphenylene, or dibromomethylazobenzene. Also, a linear polyoxazoline, which is industrially used, such as poly(methyloxazoline), poly(ethyloxazoline), or poly(methylvinyloxazoline) can be used as a precursor polymer as it is.

The star-shaped precursor polymer can be obtained by polymerizing the oxazoline monomer using a polymerization initiator having a tri- or polyvalent functional group. Examples of the tri- or polyvalent polymerization initiator include a polymerization initiator having a trivalent functional group such as tribromomethylbenzene; a polymerization initiator having a tetravalent functional group such as tetrabromomethylbenzene, tetra(4-chloromethylphenyl)porphyrin, or tetrabromoethoxyphthalocyanine; and a polymerization initiator having a hexa- or polyvalent functional group such as hexabromomethylbenzene or tetra(3,5-ditosylethyloxyphenyl)porphyrin.

The comb-shaped precursor polymer can be obtained by polymerizing an oxazoline monomer from a polymerization initiation group using a linear polymer having a polyvalent polymerization initiation group. For example, a hydroxyl group of a polymer having a hydroxyl group in the side chain such as epoxy resin or polyvinyl alcohol is halogenated by bromine or iodine, or converted into a toluenesulfonyl group, and then the conversion moiety can be used as the polymerization initiation group.

In the method of obtaining a comb-shaped precursor polymer, a polyamine type polymerization terminator can also be used. For example, a comb-shaped polyoxazoline can be obtained by polymerizing oxazoline using a monovalent polymerization initiator, thereby bonding the end of polyoxazolines to an amino group of polyamine such as polyethyleneimine, polyvinylamine, or polypropylamine.

The straight chain backbones made of polyoxazolines of the resulting precursor polymer may be hydrolyzed under acid conditions or alkali conditions.

In the hydrolysis under acid conditions, hydrochloride of polyethyleneimine can be obtained by stirring polyoxazoline under heating in an aqueous hydrochloric acid solution. A crystal powder of a basic polyethyleneimine can be obtained by treating the resulting hydrochloride with excess ammonia water. The aqueous hydrochloric acid solution to be used may be a concentrated hydrochloric acid or an aqueous solution having a concentration of about 1 mol L. In order to efficiently conduct hydrolysis, an aqueous hydrochloric acid solution having a concentration of 5 mol/L is preferably used. The reaction temperature is preferably about 80° C.

Hydrolysis under alkali conditions can convert polyoxazoline into polyethyleneimine using an aqueous sodium hydroxide solution. After reacting under alkali conditions, excess sodium hydroxide is removed by washing the reaction solution with a dialysis membrane, thereby making it possible to obtain a crystal powder of polyethyleneimine. The concentration of sodium hydroxide to be used may be within a range from 1 to 10 mol/L, and is preferably from 3 to 5 mol/L so as to efficiently conduct the reaction. The reaction temperature is preferably about 80° C.

The amount of an acid or an alkali in the hydrolysis under acid conditions or alkali conditions may be within a range from 1 to 10 equivalents based on an oxazoline unit in the polymer, and is preferably about 3 equivalents so as to improve reaction efficiency and to simplify an aftertreatment.

The straight chain backbones made of polyoxazolines in the precursor polymer are converted into straight chain polyethyleneimine backbones by the hydrolysis, and thus a polymer including the polyethyleneimine backbones can be obtained.

When a block copolymer of a straight chain polyethyleneimine block and the other polymer block is formed, it can be obtained by using a precursor polymer as a block copolymer of a straight chain polymer block made of polyoxazolines and the other polymer block, and selectively hydrolyzing the straight chain block made of polyoxazolines in the precursor polymer.

When the other polymer block is a water-soluble polymer block such as poly(N-propionylethyleneimine), a block copolymer can be formed by making use of the fact that poly(N-propionylethyleneimine) has higher solubility in an organic solvent than that of poly(N-formylethyleneimine) or poly(N-acetylethyleneimine). That is, a precursor polymer made of a poly(N-formylethyleneimine) block or a poly(N-acetylethyleneimine) block, and a poly(N-propionylethyleneimine) block is obtained by subjecting 2-oxazoline or 2-methyl-2-oxazoline to cationic ring-opening living polymerization in the presence of the polymerization initiation compound and polymerizing the resulting living polymer with 2-ethyl-2-oxazoline. An emulsion is formed by dissolving the precursor polymer in water and mixing the aqueous solution with an organic solvent, which is incompatible with water that dissolves the poly(N-propionylethyleneimine) block, followed by stirring. By adding an acid or alkali to an aqueous phase of the emulsion, the poly(N-formylethyleneimine) block or the poly(N-acetylethyleneimine) block is preferentially hydrolyzed, and thus a block copolymer made of a straight chain polyethyleneimine block and a poly(N-propionylethyleneimine) block can be formed.

When the polymerization initiation compound used herein has a valence of 1 or 2, a linear block copolymer is obtained. When the valence is more than the above range, a star-shaped block copolymer is obtained. By using a multi-stage polymer as the precursor polymer, it is possible to obtain a polymer having a multi-stage block structure.

[Metals, Metal Ions]

Metal ions in the present invention are coordinately bonded to a polyethyleneimine unit in polyethyleneimine backbones by a strong coordinative ability of the polyethyleneimine backbones in the polymer including straight chain polyethyleneimine backbones, thereby forming a metal complex. The metal complex is obtained by coordination of the metal ions to the polyethyleneimine unit. Unlike the process of an ionic bond, the complex can be formed by coordination of polyethyleneimine even if the metal is a cation or an anion. Therefore, metal species of the metal ions are not specifically limited as long as they can be coordinately bonded to the polyethyleneimine unit in the polymer including straight chain polyethyleneimine backbones, and examples thereof include metal compounds of alkali metals, alkali earth metals, transition metals, metalloid, lanthanum-based metals, and polyoxometalates, and metal ions having these metal species can be preferably used.

Examples of the alkali metal ions include ions of Li, Na, K, and Cs. As a pairing anion of the alkali metal ions, Cl, Br, I, $NO_3$, $SO_4$, $PO_4$, $ClO_4$, $PF_6$, $BF_4$, and $F_3CSO_3$ can be preferably used.

Examples of the alkali earth metal ions include ions of Mg, Ba, and Ca.

A transition metal-based ion can be preferably used for formation of a complex even if it is a transition metal cation ($Mn^+$), or transition metal is an acid radical anion ($MOxn^-$) bonded to oxygen or an anion ($MLxn^-$) bonded to halogens. As used herein, transition metal means Sc and Y of Group 3 of the Periodic Table, and Periods 4-6 transition metal elements of Groups 4 to 12.

Examples of the transition metal cation include cations ($Mn^+$) of the following transition metals, for example, mono-, di-, tri- and tetravalent cations of Ti, V, Cr, Mn, Fe, Co, Ni, Cu, Zn, Y, Zr, Mo, Ru, Rh, Pd, Ag, Cd, W, Os, Ir, Pt, Au, and Hg. A pairing anion of these metal cations may be Cl, $NO_3$, $SO_4$, or a polyoxometalate anion, or organic anion of carboxylic acids. In the case of Ag, Au, and Pt which are likely to be reduced by polyethyleneimine backbones, a complex is preferably prepared by suppressing the reducing reaction, for example, by adjusting the pH to acid conditions.

Examples of the transition metal anion include the following transition metal anions ($MOxn^-$), for example, anions of $MnO_4$, $MoO_4$, $ReO_4$, $WO_3$, $RuO_4$, $CoO_4$, $CrO_4$, $VO_3$, $NiO_4$, and $UO_2$.

The metal ions of the present invention may be a form of a metal compound of polyoxometalates in which the transition metal anion is fixed in silica via metal cations coordinated to the ethyleneimine unit in the polymer including straight chain polyethyleneimine backbones. Specific examples of the polyoxometalates include molybdates, tungstates and vanadates combined with the transition metal cation.

Furthermore, an anion ($MLxn^-$) including the following metals, for example, an anion in which metal is coordinated to a halogen, such as $AuCl_4$, $PtCl_6$, $RhCl_4$, $ReF_6$, $NiF_6$, $CuF_6$, $RuCl_6$, and $In_2Cl_6$ can be preferably used for formation of a complex.

Examples of the metalloid-based ion include ions of Al, Ga, In, Tl, Ge, Sn, Pb, Sb, and Bi. Among these ions, ions of Al, Ga, In, Sn, Pb, and Tl are preferable.

Examples of the lanthanum-based metal ions include trivalent cations of La, Eu, Gd, Yb, and Eu.

Metals in the present invention are not specifically limited as long as they can be obtained by reducing metal ions, and examples of the metal ion species include metal ions described above. Among these, transition metals such as Au, Ag, Cu, Pt, Pd, Mn, Ni, Rh, Co, Ru, Re, and Mo can be preferably used. Among these transition metals, Au, Ag, Pt, and Pd can be preferably used because the metal ions are spontaneously reduced at room temperature or in a heated state after coordination to polyethyleneimine.

Metals or metal ions in the composite nanofiber may be one, or two or more kinds.

[Silica Nanofiber]

The silica nanofiber constituting the composite nanofiber of the present invention has a fiber shape having a thickness of several nm to several hundreds of nm, and preferably from 15 to 100 nm. The length of the fiber shape of the silica nanofiber is not specifically limited, but is preferably within a range from 0.1 μm to 3 mm. The silica nanofiber is formed by coating a crystalline polymer filament formed of the polymer including straight chain polyethyleneimine backbones with silica, and therefore has a hollow shape.

As the silica of the silica nanofiber, silica obtained by the sol-gel reaction of a conventionally known silica source can be used.

[Composite Nanofiber, Metal-Containing Silica Nanofiber]

The composite nanofiber of the present invention is a composite nanofiber in which the polymer including straight chain polyethyleneimine backbones to which at least one kind of metals or metal ions are coordinated are included in the silica nanofiber, and the composite nanofiber has a characteristic feature capable of constructing various shapes.

The composite nanofiber of the present invention has the same shape as that of the silica nanofiber constituting the composite nanofiber and has a fiber shape having a thickness of about several nm to several hundreds of nm, and preferably from 15 to 100 nm as a basic structure, and the composite nanofiber of the present invention can exhibit various shapes by association of primary structures, including a shape of primary structures. The length of the fiber shape as the primary structure is not specifically limited, but is preferably within a range from 0.1 μm to 3 mm.

Metals or metal ions in the composite nanofiber are present in the state of being coordinately bonded to the polymer including straight chain polyethyleneimine backbones. It is considered that the metal ions are coordinately bonded to the polymer including straight chain polyethyleneimine backbones so as to form a complex, and therefore the metal complex is present in the hollow silica nanofiber.

It is also considered that the metals are present in the silica nanofiber in a crystalline state where metal ions which form the metal complex are reduced. The metals can form a wire shape or a particle shape by reduction via a cluster. In the case of metals having a particle shape, plural metals are in the state of being contact with each other. Also, metals having a wire shape and metals having a particle shape are simultaneously present in the silica nanofiber. The thickness of the wire shape or the particle size of the particle shape is of nanometer order which is smaller than the thickness of the primary structure. The thickness of the metal having a wire shape is preferably from about 2 to 20 nm, and the particle size of the metal having a particle shape is preferably from about 2 to 20 nm.

The composite nanofiber of the present invention can form an association having a two-dimensional or three-dimensional spatial shape of a micrometer or millimeter order (as used herein, the association is referred to as a composite nanofiber association) by association of the nanofiber shapes. The association shape can be adjusted to various shapes such as lettuce, fiber, sponge, aster, cactus, and dandelion. These association shapes can be controlled by a geometric shape of the structure of the polymer including straight chain polyethyleneimine backbones, molecular weight, non-ethyleneimine moiety which can be introduced in the polymer, and conditions for formation of a crystal formed of the polymer, and are particularly influenced by the molecular structure of the monomer to be used, the polymerization degree, the composition, and the method of preparing a polymer crystal.

Furthermore, a structure having a macro external shape having a size of millimeter order or more (as used herein, the structure is referred to as a complex structure) can be formed by bonding the composite nanofiber associations each other or bonding the association through the other composite nanofiber. It is possible to form a structure having any external shape such as disk, column, plate, filter, membrane, sphere, or rod according to specific application requirements, and it is possible to form various states such as powder, particle, polyhedron, and cylinder. In the structure, an association shape of the composite nanofiber association exists, and the association is based on the composite nanofiber of the present invention. Therefore, the structure has a three-dimensional network structure which is complicatedly formed by these composite nanofibers.

The content of silica in the composite nanofiber of the present invention is not specifically limited as long as various structures can be constructed, but is preferably within a range from 30 to 80% by mass because various structures can be stably formed. The content of metals or metal ions can be appropriately adjusted according to various applications.

The polymer in the composite nanofiber of the present invention, which includes reduced metal therein, can be easily removed by baking, thereby forming a nanofiber in which nanoparticles and metals having a nanowire shape are included in a silica nanofiber (as used herein, the nanofiber is referred to as a metal-containing silica nanofiber). The metal-containing silica nanofiber can maintain the association shape and the structure shape when the polymer is removed, and therefore the association and the structure of the metal-containing silica nanofiber can also be formed.

As described above, the composite nanofiber and metal-containing silica nanofiber of the present invention include metals or metal ions therein and also can construct various shapes, and therefore can be expected to be widely used in the overall fields of nano-technologies, for example, nanometal catalysts, nanometal conductive materials, nanometal color materials, nanometal sensors, and medical materials. In particular, the composite nanofiber also includes a polymer including straight chain polyethyleneimine backbones and therefore can be applied in the fields of biology and ecofriendly products.

[Method for Producing Composite Nanofiber]

It is considered that control of the shape of silica and the presence of coordinating molecules capable of concentrating metal ions in silica are essential so as to produce the composite nanofiber of the present invention. In the production method of the present invention, it is possible to realize a composite nanofiber, which includes metals or metal ions therein and also can construct various shapes, by using a polymer including straight chain polyethyleneimine backbones as the coordinating molecules, (i) associating the polymer including straight chain polyethyleneimine backbones, thereby forming various shapes, and allowing the sol-gel reaction to process on the surface of the association, thereby fixing silica; and (ii) highly concentrating metal ions by the polymer including straight chain polyethyleneimine backbones present in the silica, and optionally reducing the metal ions on the moment.

In the step (i), since the straight chain polyethyleneimine backbones in the polymer including straight chain polyethyleneimine backbones are soluble in water but are present as an insoluble association at room temperature, a nanometer-thick crystalline polymer filament having properties of a crystal can be formed when a crystal is formed by linear polyethyleneimine backbone moieties of polymers. This crystalline polymer filament functions as a template. On the surface of the crystalline polymer filament, a lot of free polyethyleneimine chains which bear no relation to a crystal exit inevitably, and these free chains hang down on the surface of the crystalline polymer filament. These chains serve as the scaffold for fixing silica polymerized in the vicinity and also serve as a catalyst for polymerizing a silica source.

By allowing the sol-gel reaction to proceed on the surface of the crystalline polymer filament including straight chain polyethyleneimine backbones, a polymer-containing silica nanofiber in which the surface of the crystalline polymer filament is coated with silica is obtained. In this case, the shape constructed by the crystalline polymer filament is copied to silica, and therefore it becomes possible that the polymer-containing silica nanofiber constructs various shapes which can be derived from the crystalline polymer filament.

Since the crystalline polymer filament including straight chain polyethyleneimine backbones gives a hydrogel capable of easily controlling the shape in the presence of water, a structure composed of a polymer-containing silica nanofiber, in which a shape of each polymer association is incorporated into a large mass of a silica gel, is obtained by forming the hydrogel into any shape, crosslinking crystalline polymer filaments in the hydrogel through a chemical bond due to a compound having two or more functional groups, and conducting the sol-gel reaction. Since the external shape of the hydrogel can be formed into various shapes, it becomes possible to control macro shape of the structure.

By bringing the polymer-containing silica nanofiber capable of constructing various shapes into contact with an aqueous metal ion solution, a lot of metal ions are incorporated in the polymer-containing silica nanofiber due to the function of the step (ii), and the metal ions form a coordinate bond together with the polymer including straight chain polyethyleneimine backbones in silica. Therefore, the association of the polymer is decomposed in the silica nanofiber, while a polymer/metal ion complex is formed, and a composite nanofiber including the polymer including straight chain polyethyleneimine backbones and metal ions in the silica nanofiber is obtained.

The polymer/metal ions complex is spontaneously reduced or reduced by adding the other reducing agent, and then converted into a metal crystal via a metal cluster. When metal is reduced, the silica nanofiber or the structure shape constructed by the silica nanofiber does not change, and the polymer in the silica nanofiber can not flow out from the silica nanofiber. Therefore, it is possible to obtain a composite nanofiber including a polymer including straight chain polyethyleneimine backbones and metals in a silica nanofiber in which the shape was controlled by the polymer including straight chain polyethyleneimine backbones.

A specific method for producing a composite nanofiber of the present invention includes:

a method for producing a composite nanofiber, which includes the following steps (1) to (3) of:
(1) dissolving a polymer including straight chain polyethyleneimine backbones in a solvent, and precipitating the polymer in the presence of water to obtain a crystalline polymer filament of the polymer including straight chain polyethyleneimine backbones,
(2) bringing the crystalline polymer filament into contact with an alkoxysilane in the presence of water, thereby coating the crystalline polymer filament with silica to obtain a polymer-containing silica nanofiber, and
(3) bringing the polymer-containing silica nanofiber into contact with a solution in which metal ions are dissolved, thereby coordinatively bonding the metal ions to the straight chain polyethyleneimine backbones in the polymer, or a method for producing a composite nanofiber, which includes the steps (1) to (4) of:
(1) dissolving a polymer including straight chain polyethyleneimine backbones in a solvent, and precipitating the polymer in the presence of water to obtain a crystalline polymer filament of the polymer including straight chain polyethyleneimine backbones,
(2) bringing the crystalline polymer filament into contact with an alkoxysilane in the presence of water, thereby coating the crystalline polymer filament with silica to obtain a polymer-containing silica nanofiber,
(3) bringing the polymer-containing silica nanofiber into contact with a solution in which metal ions are dissolved, thereby coordinatively bonding the metal ions to the straight chain polyethyleneimine backbones in the polymer, and
(4) reducing transition metal ions coordinatively bonded to the straight chain polyethyleneimine backbones in the polymer.

[Step of Obtaining Crystalline Polymer Filament]

In the production method of the present invention, first, by the step (1) of dissolving a polymer including straight chain polyethyleneimine backbones in a solvent, and precipitating the polymer in the presence of water to obtain a crystalline polymer filament of the polymer including straight chain polyethyleneimine backbones, a crystalline polymer filament including straight chain polyethyleneimine backbones, which can serve a template of the shape of the composite nanofiber of the present invention, is formed. The polymer including straight chain polyethyleneimine backbones, which can be used herein, may be the same as those described above.

Regarding the polymer including straight chain polyethyleneimine backbones, the straight chain polyethyleneimine backbones exhibit crystallinity in an aqueous medium and are crystallized, and the resulting crystals are associated with each other, thereby forming a crystalline polymer filament. The crystalline polymer filament can be formed into a hydrogel having a three-dimensional network structure by a physical bond of the crystalline polymer filaments in the presence of water, or can be formed into a crosslinked hydrogel having a chemical crosslink by crosslinking the crystalline polymer filaments using a crosslinking agent. The use of these hydrogels is preferable because the shape of a composite nanofiber association obtained by adjusting the conditions for forming the hydrogel can be easily adjusted and also the external shape is easily controlled in the case of forming a complex nanofiber structure.

The crystalline polymer filament has properties of a crystal in the structure because plural straight chain polyethyleneimine backbones in a primary structure of the polymer including straight chain polyethyleneimine backbones are crystallized in the presence of water molecules, and thus polymers are associated with each other and grow in a fiber shape.

The crystalline polymer filament has a fiber shape having thickness within a range from about 1 to 100 nm, preferably from 2 to 30 nm, and more preferably from 2 to 10 nm, and having a length which is 10 times or more, and preferably 100 times or more greater than the thickness (hereinafter the fiber shape of the crystalline polymer filament is sometimes referred to as a primary shape).

The polyethyleneimine, which has hitherto been used widely, is a branched polymer obtained by ring-opening polymerization of a cyclic ethyleneimine, and a primary amine, a secondary amine and a tertiary amine are present in the primary structure. Therefore, a branched polyethyleneimine is water-soluble but has no crystallinity, and, in order to from a hydrogel using the branched polyethyleneimine, a network structure must be given by a covalent bond using a crosslinking agent. However, a linear polyethyleneimine included as backbones in the polymer used in the present invention is composed only of a secondary amine, and the secondary amine type linear polyethyleneimine can be crystallized although it is water-soluble.

It is known that the polymer crystal structure of the crystal of the linear polyethyleneimine remarkably varies according to the number of crystal water included in the ethyleneimine unit of the polymer (Y. Chatani et al., Macromolecules, 1981, Vo. 14, p. 315-321). It is known that an anhydrous polyethyleneimine has priority to a crystal structure characterized by a double helix structure and, when two water molecules are included in the monomer unit, the polymer grows to form a crystal substance characterized by a zigzag structure. Actually, the crystal of the linear polyethyleneimine obtained in water is a crystal including two water molecules in one monomer unit, and the crystal is insoluble in water at room temperature.

Similar to the above case, the crystalline polymer filament of the polymer including straight chain polyethyleneimine backbones in the present invention is formed by the occurrence of crystallization of the straight chain polyethyleneimine backbones. Even if the polymer configuration is a linear, star-shaped, or comb-shaped configuration, a crystalline polymer filament is obtained in the case of a polymer including straight chain polyethyleneimine backbones in a primary structure.

The presence of the crystalline polymer filament can be confirmed by X-ray scattering, and is confirmed by peaks attributed to straight chain polyethyleneimine backbones in a crystalline hydrogel as a $2\theta$ angle value of about 20°, 27°, and 28° in a wide-angle X-ray diffractometer (WAXS).

A melting point determined by a differential scanning calorimeter (DSC) of the crystalline polymer filament also depends on the primary structure of the polymer including polyethyleneimine backbones, and the melting point is approximately appears at 45 to 90° C.

The crystalline polymer filament can form a hydrogel having a three-dimensional network structure by a physical bond of the crystalline polymer filaments in the presence of water, and furthermore a crosslinked hydrogel having a chemical crosslink can be formed by crosslinking the crystalline polymer filaments using a crosslinking agent.

In the hydrogel of the crystalline polymer filament, crystalline polymer filaments associated with each other in the presence of water form a three-dimensional shape having a size of micrometer or millimeter (hereinafter fine three-dimensional shape is sometimes referred to as a secondary shape). Between these associations having a secondary shape, the crystalline polymer filaments in the association are further physically associated, thereby forming a crosslinked structure and generally forming a three-dimensional network structure composed of the crystalline polymer filaments. Since these are formed in the presence of water, a hydrogel including water in the three-dimensional network structure is formed. When the crosslinking agent is used, the crystalline polymer filaments are chemically crosslinked, thereby obtaining a crosslinked hydrogel in which the three-dimensional network structure is fixed by chemical crosslinking.

As used herein, the three-dimensional network structure is a network structure formed by physical crosslinking of the crystalline polymer filament through a hydrogen bond of free ethyleneimine chains which are present on the surface, unlike a conventional polymer hydrogel. Therefore, at the temperature higher than the melting point of the crystal, the crystal is dissolved in water, and the three-dimensional network structure is also decomposed. However, the temperature returns to room temperature, the crystalline polymer filament grows, and a physical crosslinking is formed between the crystals by a hydrogen bond, and therefore the three-dimensional network structure appears again.

The secondary shape which is formed by crystalline polymer filaments in a hydrogel can be controlled to various shapes such as fiber, brush, and star by adjusting a geometric shape of the polymer structure, molecular weight, non-ethyleneimine moiety which can be introduced in the primary structure, and conditions for formation of a crystalline polymer filament. The hydrogel generally maintains the external shape (hereinafter the external shape of the hydrogel is sometimes referred to as a tertiary shape) but can be optionally deformed by an external force, and therefore the shape can be easily controlled.

The crystalline polymer filament is obtained by dissolving a polymer including straight chain polyethyleneimine backbones in a solvent and precipitating the polymer in the presence of water, utilizing properties of the polymer including straight chain polyethyleneimine backbones of being insoluble in water at room temperature.

Specific method includes, a method of dissolving a polymer including straight chain polyethyleneimine backbones in water, or a solvent mixture of water and a hydrophilic organic solvent (which is referred to as an aqueous medium), and heating the solution, followed by cooling; and a method of dissolving a polymer including straight chain polyethyleneimine backbones in a hydrophilic organic solvent and adding water to the solution.

As the solvent which dissolves the polymer including straight chain polyethyleneimine backbones, an aqueous medium or a hydrophilic organic solvent can be preferably used. Examples of the hydrophilic organic solvent include methanol, ethanol, tetrahydrofuran, acetone, dimethyl acetamide, dimethyl sulfoxide, dioxirane, and pyrrolidone.

Since the presence of water is essential so as to precipitate a crystalline polymer filament from the solution of the polymer including straight chain polyethyleneimine backbones, precipitation arises in an aqueous medium.

In the above method, a hydrogel made of a crystalline polymer filament can be obtained by adjusting the amount of the polymer including straight chain polyethyleneimine backbones. For example, the hydrogel is obtained by the following procedure. First, a polymer including straight chain polyethyleneimine backbones is dispersed in a fixed amount of water, and the dispersion is heated, thereby obtaining a transparent aqueous solution of a polymer including polyethyleneimine backbones. Then, the aqueous solution of the polymer in a heated state is cooled to room temperature, thereby obtaining a hydrogel. The hydrogel is deformed by an external force such as shear force, but is in a state of ice cream capable of maintaining a general shape and can be formed into various shapes.

In the above method, the heating temperature is preferably 100° C. or lower, and more preferably within a range from 90 to 95° C. The content of the polymer in the polymer dispersion is not specifically limited as long as the hydrogel can be obtained, but is preferably within a range from 0.01 to 20% by mass, and more preferably from 0.1 to 10% by mass so as to obtain a hydrogel having a stable shape. As described above, in the present invention, when the polymer including straight chain polyethyleneimine backbones is used, a hydrogel can be formed even in the case of low concentration of the polymer.

By the process of decreasing the temperature of the aqueous polymer solution to room temperature, the secondary shape of the crystalline polymer filament in the resulting hydrogel can be adjusted. The method of decreasing the temperature includes a method of maintaining an aqueous polymer solution at 80° C. for one hour, decreasing the temperature to 60° C. over one hour, maintaining at the same temperature for one hour, decreasing the temperature to 40° C. over one hour, and naturally decreasing the temperature to room temperature; a method of cooling the aqueous polymer solution at a stretch using ice water at a temperature of a freezing point, methanol/dry ice at a temperature below the freezing point, or a refrigerant liquid of acetone/dry ice, and maintaining the state in a water bath at room temperature; and a method of decreasing the temperature of the aqueous polymer solution to room temperature in a water bath at room temperature or an air at room temperature.

Since the process of decreasing the temperature of the aqueous polymer solution exerts a strong influence on association of crystalline polymer filaments in the resulting hydrogel, the secondary shape formed of the crystalline polymer filament in the hydrogel obtained by the above different method is not identical.

When the temperature of the aqueous polymer solution is decreased in multiple stages while maintaining at a fixed concentration, the secondary shape formed of the crystalline polymer filament in the hydrogel can be converted into a fiber-shaped shape. When the temperature was returned to room temperature after quenching, the secondary shape is converted into a petal-shaped shape. When the temperature was returned to room temperature after quenching again using dry ice-like acetone, the secondary shape is converted into a wave shape. As described above, the form of the secondary shape formed of the crystalline polymer filament in the hydrogel of the present invention can be set to various shapes.

The hydrogel thus obtained is an opaque gel, and a crystalline polymer filament made of a polymer including polyethyleneimine backbones is formed in the gel, and also the crystalline polymer filaments are physically crosslinked with each other by a hydrogen bond, thereby forming a three-dimensional physical network structure. Once formed crystalline polymer filament in the hydrogel maintains an insoluble state at room temperature, but the crystalline polymer filament is dissociated when heated, and the hydrogel is converted into a sol state. Therefore, the physical hydrogel of the present invention can be reversively converted into a sol, or the resulting sol can be reversively converted into a gel by subjecting to a heat treatment.

The hydrogel as used herein at least contains water in a three-dimensional network structure, and a hydrogel containing an organic solvent is obtained by adding a hydrophilic organic solvent in the case of preparing the hydrogel. Examples of the hydrophilic organic solvent include methanol, ethanol, tetrahydrofuran, acetone, dimethyl acetamide, dimethyl sulfoxide, dioxirane, and pyrrolidone.

The content of the organic solvent is preferably 0.1 to 5 times, and more preferably 1 to 3 times, as much as the volume of water.

The addition of the hydrophilic organic solvent can change the shape of the crystalline polymer filament and give a crystal having a shape which is different from that of a simple aqueous system. For example, the shape is a branched secondary shape spread in a fiber-shape in water; however, a ball-shaped secondary shape like a contracted fiber can be obtained when a fixed amount of ethanol is included.

In the case of preparing a hydrogel of the present invention, a hydrogel containing a water-soluble polymer is obtained by adding the other water-soluble polymer. Examples of the water-soluble polymer include polyethylene glycol, polyvinyl alcohol, polyvinyl pyrrolidone, polyacrylamide, poly(N-isopropylacrylamide), polyhydroxyethyl acrylate, polymethyloxazoline, and polyethyloxazoline.

The content of the water-soluble polymer is preferably 0.1 to 5 times, and more preferably 0.5 to 2 times, as much as the mass of the polymer including straight chain polyethyleneimine backbones.

The addition of the water-soluble polymer can change the shape of the crystalline polymer filament and give a secondary shape which is different from that of a simple aqueous system. It is also effective to increase viscosity of the hydrogel and to improve stability of the hydrogel.

By treating the hydrogel obtained by the above method with a compound having a di- or polyfunctional group capable of reacting with an amino group of polyethyleneimine, a crosslinked hydrogel, in which surfaces of crystalline polymer filaments in the hydrogel are linked through a chemical bond, can be obtained.

As the compound having a di- or polyfunctional group capable of reacting with an amino group at room temperature, for example, an aldehydes crosslinking agent, an epoxy crosslinking agent, acid chlorides, an acid anhydride, and an ester crosslinking agent can be used. Examples of the aldehyde crosslinking agent include malonyl aldehyde, succinyl aldehyde, glutaryl aldehyde, phthaloyl aldehyde, isophthaloyl aldehyde, and terephthaloyl aldehyde. Examples of the epoxy crosslinking agent include polyethylene glycol diglycidyl ether, bisphenol A diglycidyl ether, glycidyl chloride, and glycidyl bromide. Examples of the acid chlorides include malonyl acid chloride, succinyl acid chloride, glutaryl acid chloride, adipic acid chloride, phthaloyl acid chloride, isophthaloyl acid chloride, and terephthaloyl acid chloride. Examples of the acid anhydride include phthalic anhydride, succinic anhydride, and glutaric anhydride. Examples of the ester crosslinking agent include malonyl acid methyl ester, succinyl acid methyl ester, glutaryl acid methyl ester, phthaloyl acid methyl ester, and polyethylene glycol carboxylic acid methyl ester.

The crosslinking reaction can also be conducted by a method of immersing the resulting hydrogel in a solution of a crosslinking agent, or a method of adding a crosslinking agent solution in the hydrogel. In that case, the crosslinking agent penetrates into the hydrogel with the change of the osmotic pressure in the system, where crystalline polymer filaments are connected through a hydrogen bond, thereby causing the chemical reaction between ethyleneimine and a nitrogen atom.

The crosslinking reaction proceeds by the reaction with free ethyleneimine on the surface of the crystalline polymer filament. However, in order to prevent the reaction from occurring in the crystalline polymer filament, the reaction is preferably conducted at the temperature lower than a melting point of the crystalline polymer filament which forms the hydrogel, and the crosslinking reaction is conducted at room temperature most preferably.

When the crosslinking reaction is allowed to proceed at room temperature, a crosslinked hydrogel can be obtained by allowing the hydrogel and a crosslinking agent solution to stand in a mixed state. The crosslinking reaction time may be from several minutes to several days, and the crosslinking reaction suitably proceeds by allowing to stand overnight.

The amount of the crosslinking agent is preferably from 0.05 to 20%, and more preferably from 1 to 10%, based on the number of mols of an ethyleneimine unit in the polymer including polyethyleneimine backbones used for formation of the hydrogel.

The hydrogel can realize gel structure of various morphologies because a gelling agent is a crystalline polymer filament. Even if a small amount of the crystalline polymer filament is used, a three-dimensional network structure is suitably formed in water, and therefore high water retention is attained. Furthermore, mechanical design and synthesis of the polymer including straight chain polyethyleneimine backbones are easily conducted, and also the hydrogel is easily prepared. Also the shape of the hydrogel can be fixed by crosslinking the crystalline polymer filaments in the hydrogel using a crosslinking agent.

[Step of Obtaining Polymer-Containing Silica Nanofiber]

The production method of the present invention includes the step (2) of bringing the crystalline polymer filament into contact with an alkoxysilane in the presence of water, thereby coating the crystalline polymer filament with silica to obtain a polymer-containing silica nanofiber (as used herein, the nanofiber is referred to as a polymer-containing silica nanofiber) after the step (1). Also a structure composed of the polymer-containing silica nanofiber can be obtained by bringing into contact with a silica source in the state where the crystalline polymer filament is crosslinked with a crosslinking agent, the state where crystalline polymer filament forms a hydrogel, or the state where the hydrogel is crosslinked with a crosslinking agent.

The method of bringing the crystalline polymer filament into contact with the alkoxysilane includes a method of adding a solution, which is prepared by dissolving a silica source in a solvent that can be used in a conventional sol-gel reaction, in a dispersion of a crystalline polymer filament in water, or a hydrogel or a crosslinked hydrogel of a crystalline polymer filament, and conducting the sol-gel reaction at room temperature. A polymer-containing silica nanofiber and a structure of the polymer-containing silica nanofiber can be easily obtained by the method.

Examples of the alkoxysilane used as the silica source include tri- or polyvalent alkoxysilanes (alkoxysilane having three or more substituents) such as tetraalkoxysilanes and alkyltrialkoxysilanes.

Examples of the tetraalkoxysilanes include tetramethoxysilane, tetraethoxysilane, tetrapropoxysilane, tetrabutoxysilane, and tetra-t-butoxysilane.

Examples of the alkyltrialkoxysilanes include methyltrimethoxysilane, methyltriethoxysilane, ethyltrimethoxysilane, ethyltriethoxysilane, n-propyltrimethoxysilane, n-propyltriethoxysilane, iso-propyltrimethoxysilane, iso-propyltriethoxysilane, 3-chloropropyltrimethoxysilane, 3-chloropropyltriethoxysilane, vinyltrimethoxysilane, vinyltriethoxysilane, 3-glycidoxypropyltrimethoxysilane, 3-glycidoxypropyltriethoxysilane, 3-aminopropyltrimethoxysilane, 3-aminopropyltriethoxysilane, 3-mercaptopropyltrimethoxysilane, 3-mercaptotriethoxysilane, 3,3,3-trifluoropropyltrimetyhoxysilane, 3,3,3-trifluoropropyltriethoxysilane, 3-methacryloxypropyltrimethoxysilane, 3-methacryloxypropyltriethoxysilane, phenyltrimethoxysilane, phenyltriethoxysilane, p-chloromethylphenyltrimethoxysilane, p-chloromethylphenyltriethoxysilane, dimethyldimethoxysilane, dimethyldiethoxysilane, diethyldimethoxysilane, and diethyldiethoxysilane.

The sol-gel reaction, which provides the polymer-containing silica nanofiber, proceeds in an aqueous medium in the presence of a crystalline polymer filament, but the reaction does not arise in an aqueous medium phase and proceeds on the surface of the crystalline polymer filament. Therefore, the reaction is conducted under any reaction conditions unless the crystalline polymer filament is dissolved under the complexation reaction conditions.

In order to make the crystalline polymer filament to be insoluble, the content of water in an aqueous liquid containing a hydrophilic organic solvent is preferably adjusted to 20% or more, and more preferably 40% or more, in the case of the sol-gel reaction.

In the sol-gel reaction, when the amount of the alkoxysilane as the silica source is excess relative to the amount of the ethyleneimine as a monomer unit of the polyethyleneimine, a polymer-containing silica nanofiber can be suitably formed. The excess amount is preferably 2 to 1000 times greater than that of the ethyleneimine.

In the case of forming the crystalline polymer filament, the concentration of the polymer in the aqueous medium is preferably adjusted within a range from 0.1 to 30% based on the amount of the polyethyleneimine included in the polymer. The concentration of the polyethyleneimine in the aqueous medium can be adjusted to more than 30% by concentrating in the state where the crystal form of the crystalline polymer filament is maintained. As the concentration method in this case, for example, a method of subjecting a dispersion of the crystalline polymer filament in water or a hydrogel of the crystalline polymer filament to normal pressure filtration or vacuum filtration at normal temperature can be used.

The sol-gel reaction times ranges from one minute to several days. In the case of methoxysilanes which have high reaction activity of the alkoxysilane, the reaction time is preferably from one minute to 24 hours, and more preferably from 30 minutes to 5 hours so as to increase the reaction efficiency. In the case of ethoxysilanes and butoxysilanes which have low reaction activity, the sol-gel reaction time is preferably 24 hours or more, and also preferably about one week.

The polymer-containing silica nanofiber obtained in this step includes the crystalline polymer filament and silica with which the crystalline polymer filament is coated, and the thickness is from 10 to 1000 nm, and preferably from 15 to 100 nm, and the length is 10 times or more, and preferably 100 times or more greater than the thickness.

The content of the silica of the polymer-containing silica nanofiber varies within a fixed range according to the reaction conditions, but can be adjusted within a range from 30 to 90% by mass based on the entire polymer-containing silica nanofiber. The content of the silica increases with the increase of the amount of the polymer used in the case of the sol-gel reaction. It also increases by increasing the sol-gel reaction time.

The polymer-containing silica nanofiber is a complex including a crystalline polymer filament of a polymer including linear polyethyleneimine backbones as a core, the crystalline polymer filament being coated with silica. Therefore, the polymer-containing silica nanofiber can highly concentrate and adsorb metal ions by an ethyleneimine unit which is present in the crystalline polymer filament.

The polymer-containing silica nanofiber can form a structure having various shapes by associating with each other. A structure of a polymer-containing silica nanofiber can be obtained by bringing the structure into contact with a silica source in the state where the crystalline polymer filament is crosslinked with a crosslinking agent, the state where crystalline polymer filament forms a hydrogel, or the state where the hydrogel is crosslinked with a crosslinking agent. Therefore, the structure has a shape derived from a shape formed of a hydrogel or a crosslinked hydrogel of the crystalline polymer filament.

The structure of the polymer-containing silica nanofiber is a structure obtained by optionally forming a tertiary shape of a hydrogel or a crosslinked hydrogel formed of a crystalline polymer filament, and coating the crystalline polymer filament in the hydrogel with silica, thereby forming any external shape. In the structure of the polymer-containing silica nanofiber, since a secondary shape of an association formed in the hydrogel is also copied, an association shape formed of the association of the polymer-containing silica nanofiber, derived from the secondary shape formed of the crystalline polymer filament, is present.

As described above, the external shape of the structure of the polymer-containing silica nanofiber can be optionally formed because it can fix the tertiary shape formed of the crystalline polymer filament. The association shape included in the structure of the polymer-containing silica nanofiber can have various shapes such as fiber, brush, star, lettuce, sponge, aster, cactus, and dandelion according to a geometric shape of the structure of the polymer, molecular weight, non-ethyleneimine moiety which can be introduced in the primary structure, and the amount of the silica source. These association shapes can have a size of about 3 μm to 1 mm. The shape of this size is a three-dimensional shape formed by association and spatial arrangement of the polymer-containing silica nanofiber as a base unit. The polymer-containing silica nanofiber serving as the base unit includes a core of a crystalline polymer filament. That is, it is considered that the structure of the polymer-containing silica nanofiber formed a form in which the crystalline polymer filaments are connected by a physical bond through a hydrogen bond in water and arranged in the space, thereby forming a template having various three-dimensional shapes, and then silica is fixed along the template, and thus the polymer-containing silica nanofibers are associated with each other and arranged in the space.

The structure of the polymer-containing silica nanofiber is a structure in which associations obtained by associating crystalline polymer filaments are further associated thereby forming a physically crosslinked hydrogel, and the physically crosslinked hydrogel is fixed with silica. Also, an association of the polymer-containing silica nanofiber can be taken out by cutting a physical crosslink between the associations in the case of fixing with silica according to the adjustment of the structure or concentration of the polymer to be used, or the amount of the silica source, and by fixing the association of the crystalline polymer filament or plural assemblies of the associations with silica.

The association shape in the structure of the polymer-containing silica nanofiber can be adjusted by a geometric shape of the polymer structure in the case of forming a polymer-containing silica nanofiber, molecular weight, non-ethyleneimine moiety which can be introduced in the primary structure, and conditions for formation of the structure of the polymer-containing silica nanofiber. The association shape drastically depends on the molecular structure, polymerization degree and composition of the polymer to be used, and the decrease of the temperature in the case of forming a structure of the polymer-containing silica nanofiber.

For example, a complex structure of a polymer-containing silica nanofiber having a lettuce-shaped association shape can be obtained by using a linear polyethyleneimine having a polymerization degree of 300 or more as a polymer including linear polyethyleneimine backbones, naturally decreasing the temperature higher than 80° C. to normal temperature to obtain a hydrogel, and conducting the sol-gel reaction using the hydrogel. The thickness of the portion, which forms a leaf, in the lettuce-shaped association shape increases as the concentration of the polymer in a polymer solution in the case of crystallizing the polymer decreases. When the concentration is 2% or more, the thickness of the leaf portion is about 100 nm. When the concentration is 1% or less, the thickness of the leaf portion is about 500 nm.

When a star-shaped polyethyleneimine is used, the resulting secondary shape can be controlled by changing the structure of a center residue serving as a nucleus. For example, when the center residue has a large pi-plane like porphyrin, the association shape in the structure of the resulting polymer-containing silica nanofiber is an aster-shaped, and the size of a crystal of the aster shape is from about 2 to 6 μm. When the concentration is 1% or more, the aster has a small number of arms, and each arm tends to be bound. When the concentration is not more than the above range, the aster has a large number of arms, and each arm tends to be separated. In the case of a small structure in which the residue is a benzene ring, the association shape in the structure of the polymer-containing silica nanofiber has a fiber shape in which a lot of yarns are bound, and the fibers are interlocked with each other, thereby forming a structure of a sponge-shaped polymer-containing silica nanofiber. One fiber shape has a thickness of about 150 nm.

Furthermore, by using a crosslinked hydrogel in which crystalline polymer filaments are crosslinked by a chemical bond, a structure of a polymer-containing silica nanofiber having various external shapes can also be obtained. The shape and the size can be the same as the size and the shape of a container used in the preparation of a crosslinked hydrogel, and, for example, any shapes such as disk, column, plate, and sphere can be formed. Furthermore, it is possible to form into the objective shape by cutting or grinding the crosslinked hydrogel. A structure of a polymer-containing silica nanofiber having any shape can be easily obtained by immersing the crosslinked hydrogel thus formed in a solution of a silica source. The time of immersion in the solution of a silica source ranges from one hour to one week according to the kind of the silica source to be used and must be adjusted, but is preferably from about 1 to 48 hours in a solution of methoxysilanes, or preferably about 1 to 7 days in a solution of ethoxysilanes.

As described above, the polymer-containing silica nanofiber can be easily produced by dissolving a polymer including straight chain polyethyleneimine backbones, precipitating the polymer in the presence of water to obtain a crystalline polymer filament, and bringing the crystalline polymer filament into contact with an alkoxysilane in the presence of water. In the production method, the step of obtaining a polymer-containing silica nanofiber and the sol-gel reaction of silica can be conducted within a short time. Also a dispersion of the crystalline polymer filament and a hydrogel of the crystalline polymer filament can be easily prepared, and a structure of a polymer-containing silica nanofiber can be easily produced by bringing the dispersion or the hydrogel into contact with the alkoxysilane.

[Step of Obtaining Composite Nanofiber]

In the production method of the present invention, a composite nanofiber including metal ions and a polymer including straight chain polyethyleneimine backbones in a silica nanofiber can be obtained by the step (3) of bringing the polymer-containing silica nanofiber into contact with a solution in which metal ions are dissolved, thereby coordinatively bonding the metal ions to the straight chain polyethyleneimine backbones in the polymer, after the step (2).

As the metal ions, metal ions described above can be used. The solution in which metal ions are dissolved can be prepared by dissolving a salt containing the metal ions in water.

In the step (3), the method of bringing the polymer-containing silica nanofiber into contact with the solution in which metal ions are dissolved is not specifically limited and includes, for example, a method of immersing the polymer-containing silica nanofiber obtained in the step (2) in an aqueous solution of metal ions. By the method, the metal ions can be easily concentrated in a silica nanofiber. Since the metals concentrated in the polymer-containing silica nanofiber form a coordinate bond with a crystalline polymer filament in the silica nanofiber, the crystalline polymer filament is decomposed in silica, while a metal complex, in which the polymer including straight chain polyethyleneimine backbones and metal ions are coordinately bonded, is formed. Consequently, a composite nanofiber of the present invention, including the metal ions and a polymer including straight chain polyethyleneimine backbones in a silica nanofiber can be easily obtained.

When the metal ions are concentrated in the silica nanofiber, the amount of the metal ions to be concentrated in silica increases as the amount of the polymer in the polymer-containing silica nanofiber increases and a mixing ratio of the metal ions to the polymer increases. In the composite nanofiber containing the metal ions of the present invention, the metal ions in the amount of 0.1 to 0.5 mols per mol of nitrogen atoms of polyethyleneimine backbones included in the polymer-containing silica nanofiber can form a complex.

When the composite nanofiber containing metal ions is obtained, the amount of the metal ions is particularly preferably 0.1 to 10 times as much as that of an ethyleneimine unit in the case of immersing the polymer-containing silica nanofiber in an aqueous solution of metal ions.

After incorporating the metal ions, the product is taken out and then washed with normal temperature or cold water, thereby making it possible to obtain a composite nanofiber of the present invention, including the metal ions and a polymer including straight chain polyethyleneimine backbones in a silica nanofiber.

A composite nanofiber including metals and a polymer including straight chain polyethyleneimine backbones in a silica nanofiber can be obtained through the step (4) of reducing transition metal ions coordinatively bonded to the straight chain polyethyleneimine backbones in the polymer, after the step (3).

In the step (3), a metal complex in which a polymer including straight chain polyethyleneimine backbones and metal ions are coordinately bonded in a silica nanofiber is obtained by bringing the polymer-containing silica nanofiber into contact with the solution in which metal ions are dissolved. A composite nanofiber of the present invention, including metals and a polymer including straight chain polyethyleneimine backbones in a silica nanofiber is obtained by spontaneously reducing the metal ions or reducing using a reducing agent.

In the composite nanofiber containing reduced metals of the present invention, it is possible to fix metal atoms in the amount of 1 to 20 mols per mol of nitrogen atoms of polyethyleneimine backbones included in the polymer-containing silica nanofiber.

When a composite nanofiber containing metals is obtained, the amount of the metal ions is excess as possible relative to the amount of the ethyleneimine unit, and particularly preferably about 30 times as much as that of the ethyleneimine unit, in the case of immersing the polymer-containing silica nanofiber in a metal ion solution.

Among metal ions described above, metal ions of Au, Ag, Pt, and Pd are coordinated to the polyethyleneimine, spontaneously reduced at room temperature or a heated state and then converted into nonionic metal nanoparticles or metal nanowires and are therefore preferable in the case of obtaining the composite nanofiber of the present invention. The heating temperature is preferably 100° C. or lower, and particularly preferably from 60 to 80° C. Therefore, these metal ions can be reduced only by mixing the polymer-containing silica nanofiber with a metal ion solution. That is, the composite nanofiber containing metals of the present invention can be obtained without passing through the step of concentrating metal ions in silica and mixing the silica with a reducing agent solution. In the case of maintaining these metal ions, a complex is preferably prepared by suppressing the reducing reaction, for example, the pH is adjusted to acid conditions.

A composite nanofiber containing different metal species can be obtained by mixing a polymer-containing silica nanofiber with at least one kind of metal ions, simultaneously concentrating different metal ions to the complex, and reducing different ions in the case of reducing the metals.

When using metals which are not spontaneously reduced, like metal ions, or metals which are insufficient in spontaneous reduction, a metal crystal can be formed by the step of reducing metal ions coordinately bonded to straight chain polyethyleneimine backbones using a reducing agent. Also when using metal ions which are spontaneously reduced, it is possible to reduce by the step (4) using in combination with the other reducing agent, if necessary.

Examples of the reducing agent, which can be used in the step, include hydrogen, sodium borohydride, ammonium borohydride, aldehyde, and hydrazine. When metal ions are reduced using the reducing agent, the reaction can be conducted in an aqueous medium. In that case, after the polymer-containing silica nanofiber is concentrated to the metal ions, silica is preferably washed with water and then mixed with a reducing agent solution. That is, the composite nanofiber of the present invention can be obtained by reducing only metal ions included in the silica.

When metal ions coordinately bonded to straight chain polyethyleneimine backbones are reduced, the shape of the polymer-containing silica nanofiber and the shape of the association or structure of the polymer-containing silica nanofiber do not change, and the polymer included therein can not flow out of the silica nanofiber, and thus a composite nanofiber including a polymer including straight chain polyethyleneimine backbones and at least one kind of metal in a silica nanofiber is finally obtained.

The reduced metals are converted into metal particles or metal wires via metal clusters in the silica nanofiber. The metal wires are formed by reducing metal ions concentrated along the crystalline polymer filament in the polymer-containing silica nanofiber to metals.

The reducing reaction time varies depending on the kid of metal ion species, but is at least 24 hours. The reaction time increases in the case of the reaction at room temperature, while it is at least one hour in the case of the reaction under heating. The reaction time is preferably adjusted to several hours according to the kind of the metal ions.

By appropriately adjusting the temperature of the reducing reaction, the size of metals in the composite nanofiber of the present invention can be adjusted. When the transition metal has a wire shape, wires having a size within a range from about 2 to 20 nm can be formed. When the transition metal has a particle shape, particles having a particle size within a range from about 2 to 20 nm can be formed. When the size of the wire shape or the particle size of the particle shape is controlled to 10 nm or less, the temperature of the reducing reaction is preferably adjusted to 100° C. or lower.

As described above, since the production method of the present invention scarcely require complicated steps and accurate conditioning, a composite nanofiber containing metal ions or metals in silica can be easily obtained. Furthermore, since the association shape or the structure shape constructed by the polymer-containing silica nanofiber is maintained as it is, a composite nanofiber association composed of a composite nanofiber having the same shape as that of the association or structure, and a complex structure composed of a composite nanofiber can be easily obtained, and also the spatial shape can be easily controlled.

[Method for Producing Metal-Containing Silica Nanofiber]

The composite nanofiber can be converted into a metal-containing silica nanofiber by passing through step (5) of removing a polymer component in a composite nanofiber after obtaining a composite nanofiber including the metals and a polymer including straight chain polyethyleneimine backbones in a silica nanofiber.

The polymer component can be removed from the composite nanofiber by a method such as baking treatment or washing with a solvent, and a method of a baking treatment in a baking furnace is preferable because the polymer component can be completely removed.

In the baking treatment, baking at high temperature in the presence of air or oxygen, and baking at high temperature in the presence of an inert gas, for example, nitrogen or helium can be used, but baking in air is preferable.

The baking temperature is preferably 300° C., and more preferably from 300 to 900° C., because polymer including straight chain polyethyleneimine backbones as the polymer component can be removed by thermally decomposing at about 300° C.

Specifically, the baking can be conducted according to a publicly known method used in the case of baking a mesoporous material silica (Diaz et al. J. Mater. Chem. 2004, Vol. 14, page 48). It is possible to exemplify a method of allowing a complex sample at about 100° C. for 10 to 30 minutes in the heating step, heating to 300° C. at a temperature raising rate of 10° C./minute, allowing the sample to stand at the same temperature for one hour, heating again to 500° C. at the same temperature raising rate, and baking the sample at the same temperature for 1 to 6 hours. In order to raise the temperature, the sample is heated to the temperature of 700 to 800° C. at the same temperature raising rate and then baked at the same temperature for 1 to 6 hours. After baking, the temperature of the baking furnace may be naturally decreased to room temperature, or the temperature may be decreased to room temperature by flowing air through the baking furnace.

Similarly, an association of a metal-containing silica nanofiber or a structure of a metal-containing silica nanofiber can be obtained by removing a polymer component from the composite nanofiber association or the complex structure.

As described above, the composite nanofiber and the metal-containing silica nanofiber of the present invention have large surface area of a silica nanofiber and have molecule selectivity and chemical stability derived from silica used for coating, and also contain metals or metal ions therein. Because of very high aspect ratio, a shape such as nonwoven fabric can be formed by assembling or integration of fibers, and therefore can be expected to be widely used in solid electrolytes, solid catalysts, nanoadditives, nano thin film materials, nanometal catalysts, nanometal conductive materials, nanometal color materials, nanometal sensors, optical image materials, photoelectronical materials, and medical materials.

Furthermore, the composite nanofiber including, in addition to metals or metal ions, a polymer including straight chain polyethyleneimine backbones can adsorb or fix various ionic substances such as anionic biomaterials because an ethyleneimine unit in the polymer can be easily cationized. Also the polymer including straight chain polyethyleneimine backbones is easily blocked or grafted with the other polymer and the structure of the polymer side chain and the end structure is easily controlled, and therefore various functions can be imparted to the composite nanofiber by blocking with various functional polymers or controlling the end structure, and thus these materials are also useful in the fields of biology and ecofriendly products.

The structures of the complex structure and the metal-containing silica nanofiber are structures in which silica is fixed along a template connected by a physical bond, that is obtained by forming a crosslinked structure through further association of secondary shapes formed of a crystalline polymer filament in the presence of water, and thus the composite nanofibers or metal-containing silica nanofibers having a nanosized thickness are associated with each other. Therefore, these structures formed a three-dimensional network structure in which nanofibers are high assembled in the state where characteristics of the composite nanofiber and the metal-containing silica nanofiber are maintained, and the external shape can be optionally formed in the size of millimeter or more. These structures have a three-dimensional network structure therein, and therefore they can be usefully used in high functional filters such as biofilter and air filter, or catalysts with high specific surface area. Also these structures are useful materials as advanced functional materials in various fields, including the above applications, because the external shape can be easily controlled and various fine association shapes can be realized in the structure.

Since the composite nanofiber and the complex structure are novel complexes which have completely overcome difficulties of control of the shape in the case of producing conventional silica materials and are easy to produce, they are greatly expected to be applied in various industries and fields. The composite nanofiber and the complex structure of the present invention contain metals or metal ions therein and are therefore materials which are useful in domains in which metals or metal complexes having nano shape are applied, including the overall fields of silica materials.

EXAMPLES

The present invention will now be described in detail by way of examples and reference examples, but the present invention is not limited thereto. Percentages are by mass unless otherwise specified.

[Analysis by X-ray Diffraction Method]

An isolated and dried sample was placed on a holder for measuring sample and the holder was set to a wide-angle X-ray diffractometer "Rint-Ultma" manufactured by Rigaku Corporation, and then the measurement was conducted under the conditions of Cu/Kα radiation, 40 kV/30 mA, a scanning speed of 1.0°/min, and a scanning range of 10 to 40°.

[Analysis by Differential Scanning Calorimetry]

An isolated and dried sample was weighed by a measuring patch and the sample was set to a thermal analysis instrument "DSC-7", and then the measurement was conducted under the conditions of a temperature raising rate of 10° C./min and a temperature range of 20 to 90° C.

[Shape Analysis by Scanning Electron Microscope]

An isolated and dried sample was placed on a glass slide and the sample was observed by a surface observation apparatus VE-7800 manufactured by KEYENCE CORPORATION.

[Observation by Transmission Electron Microscope]

An isolated and dried sample was placed on a carbon-deposited copper grid and the sample was observed by a high-resolution transmission electron microscope EM-002B, VOYAGER M3055 manufactured by TOPCON Technologies, Noran Instruments, or a transmission electron microscope "JEM-200CX" manufactured by JEOL Ltd.

[UV-Vis Absorption Spectrum]

A silica powder containing a metal complex was placed on a quartz glass plate and the measurement was conducted by U-3500 UV-Vis equipped with an integrating sphere manufactured by Hitachi, Ltd.

Synthesis Example 1

Synthesis of Linear Polyethyleneimine-Containing Silica Nanofiber (SLP-1)

<Synthesis of Linear Polyethyleneimine (L-PEI)>

3 g of a commercially available polyethyloxazoline (number average molecular weight: 50,000, average polymerization degree: 5,000, manufactured by Aldrich Co.) was dissolved in 15 mL of an aqueous 5 M hydrochloric acid solution. The solution was heated to 90° C. in an oil bath and then stirred at the same temperature for 10 hours. To the reaction solution, 50 mL of acetone was added, thereby completely dissolving the polymer, followed by filtration and further washing with methanol three times to obtain a white powder of polyethyleneimine. The resulting powder was identified by $^1$H-NMR (heavy water) and it was confirmed that peaks at 1.2 ppm ($CH_3$) and 2.3 ppm ($CH_2$) attributed to an ethyl side chain group of polyethyloxazoline completely disappeared. That is, this fact showed that polyethyloxazoline was completely hydrolyzed and converted into polyethyleneimine.

The powder was dissolved in 5 mL of distilled water and 50 mL of 15% ammonia water was added dropwise to the solution while stirring. After the mixed solution was allowed to stand overnight, the precipitated polymer association powder was collected by filtration and the polymer association powder was washed with cold water three times. After washing, the crystal powder was dried in desiccator at room temperature to obtain a linear polyethyleneimine (L-PEI). The resulting amount was 2.2 g (containing crystal water). Only the side chain of polyethyleneimine obtained by hydrolysis of polyoxazoline changes and the main chain does not change. Therefore, the polymerization degree of L-PEI is 5000 which is the same as that before the hydrolysis.

<Linear Polyethyleneimine-Containing Silica Nanofiber>

A fixed amount of the L-PEI powder was weighed and dispersed in distilled water to prepare L-PEI dispersion. The dispersion was heated to 90° C. in an oil bath to obtain a completely transparent aqueous solution having a concentration of 1%. The aqueous solution was allowed to stand in the atmospheric environment at room temperature and naturally cooled to room temperature to obtain a hydrogel of an opaque L-PEI association.

The X-ray diffraction measurement of the resulting association was conducted. As a result, it was confirmed that peaks of a scattering intensity appear at 20.7°, 27.6°, and 28.4°. An endothermic peak was confirmed at 64.7° C. by the measurement results of a change in an endothermic state by a calorimeter. The presence of a L-PEI crystal in a hydrogel was confirmed by these measurement results.

In 5 mL of the resulting hydrogel of the L-PEI association, 5 mL of a mixed solution of tetramethoxysilane (TMSO) and ethanol in a mixing ratio of 1/1 (volume ratio) was added, followed by slight stirring for one minute and further standing for 40 minutes. The mixture was washed with excess acetone and then washed three times using a centrifuge. The solid was recovered and dried at room temperature to obtain a L-PEI-containing silica nanofiber structure (SLP-1). In the X-ray diffraction measurement of the L-PEI-containing silica nanofiber structure (SLP-1), peaks of a scattering intensity appeared at 20.5°, 27.2°, and 28.2°.

The resulting L-PEI-containing silica nanofiber structure (SLP-1) was observed by a scanning electron microscope. As a result, the L-PEI-containing silica nanofiber structure (SLP-1) had a leaf-shaped association shape.

Synthesis Example 2

Synthesis of Star-Shaped Polyethyleneimine-Containing Silica Nanofiber (SLP-2)

<Synthesis of Porphyrin Center Star-Shaped Polyethyleneimine (P-PEI)>

Porphyrin center star-shaped polymethyloxazoline as a precursor polymer was synthesized by the following procedure using the methods shown in Jin et al., J. Porphyrin & Phthalocyanine, 3, 60-64 (1999); Jin, Macromol. Chem. Phys., 204, 403-409 (2003).

After the atmosphere of a 50 ml two-necked flask equipped with a three-way stop-cock was replaced by an argon gas, 0.0352 g of tetra(p-iodomethylphenyl)porphyrin (TIMPP) and 8.0 ml of N,N-dimethyl acetamide were added and then TIMPP was completely dissolved by stirring at room temperature. To this solution, 3.4 ml (3.27 g), which is corresponding to 1280 mols per mol of porphyrin, of 2-methyl-2-oxazoline was added to the solution and the temperature of the reaction solution was adjusted to 100° C., followed by stirring for 24 hours. The temperature of the reaction solution was decreased to room temperature and, after adding 10 ml of methanol, the mixed solution was concentrated under reduced pressure. The residue was dissolved in 15 ml of methanol and the solution was poured into 100 ml of tetrahydrofuran, thereby precipitating a polymer. In the same manner, a polymer was reprecipitated and the resulting polymer obtained by suction filtration was placed in a desiccator in which $P_2O_5$ is placed, and then suction dried by an aspirator for one hour. After evacuating by a vacuum pump, the polymer was dried under vacuum for 24 hours to obtain a precursor polymer (TPMO-P). The resulting amount was 3.05 g and the yield was 92.3%.

A number average molecular weight determined by GPC of the resulting precursor polymer (TPMO-P) was 28,000 and a molecular weight distribution was 1.56. An integration ratio of an ethylene proton in a polymer arm to a pyrrole ring proton of porphyrin in a polymer center was calculated by $^1$H-NMR. As a result, an average polymerization degree of each arm was 290. Therefore, it was estimated that the number average molecular weight determined by $^1$H-NMR is 99,900. The fact that the number average molecular weight determined by $^1$H-NMR is far more than the number average molecular weight determined by GPC agrees with a general feature in a star-shaped polymer.

Using this precursor polymer, polymethyloxazoline was hydrolyzed in the same manner as in Synthesis Example 1 to obtain a star-shaped polyethyleneimine (P-PEI) in which four polyethyleneimines are bonded to a porphyrin center. As a result of the measurement of $^1$H-NMR (TMS external standard, in heavy water), a peak at 1.98 ppm attributed to a methyl side chain group of the precursor polymer before hydrolysis completely disappeared.

<Star-Shaped Polyethyleneimine-Containing Silica Nanofiber Complex>

In the same manner as in Synthesis Example 1, except that P-PEI synthesized above was used in place of the L-PEI powder in Synthesis Example 1, a hydrogel-like P-PEI association having a concentration of 1% was obtained.

The X-ray diffraction measurement of the resulting hydrogel of the P-PEI association was conducted. As a result, it was confirmed that peaks of a scattering intensity appear at 20.4°, 27.3°, and 28.1°. An endothermic peak was confirmed at 64.1° C. by the measurement results of a change in an endothermic state by a calorimeter. The presence of a P-PEI crystal in a hydrogel was confirmed by these measurement results.

In 1 mL of the resulting hydrogel of the P-PEI association, 1 mL of a mixed solution of tetramethoxysilane (TMSO) and ethanol in a mixing ratio of 1/1 (volume ratio) was added, followed by slight stirring for one minute and further standing for 40 minutes. The mixture was washed with excess acetone and then washed three times using a centrifuge. The solid was recovered and dried at room temperature to obtain a P-PEI-containing silica nanofiber structure (SLP-2). As a result of the measurement of X-ray diffraction of the P-PEI-containing silica nanofiber structure (SLP-2), peaks of a scattering intensity appeared at 20.5°, 27.4°, and 28.1°.

The resulting P-PEI-containing silica nanofiber structure (SLP-2) was observed by a scanning electron microscope. As a result, the P-PEI-containing silica nanofiber structure (SLP-2) had an astar-shaped association shape.

Synthesis Example 3

Synthesis of Star-Shaped Polyethyleneimine-Containing Silica Nanofiber (SLP-3)

<Synthesis of Benzene Ring Center Star-Shaped Polyethyleneimine (B-PEI)>

Star-shaped polymethyloxazoline, as a precursor polymer, in which six arms of polymethyloxazoline are bonded to a benzene ring center was synthesized by the following procedure using the methods shown in Jin, J. Mater. Chem., 13, 672-675 (2003).

In a test tube with a frosted mouth which is equipped with a magnetic stirring blade, 0.021 g (0.033 mmol) of hexakis (bromomethyl)benzene as a polymerization initiator was charged and, after mounting a three-way stop-cock to the mouth of the test tube, the atmosphere in the test tube was replaced by nitrogen in a vacuum state. Under a nitrogen gas flow, 2.0 ml (24 mmol) of 2-methyl-2-oxazoline and 4.0 ml of N,N-dimethyl acetamide were sequentially added from an introducing inlet of a three-way stop-cock under a nitrogen gas flow using a syringe. The test tube was heated to 60° C. in an oil bath and maintained for 30 minutes, and thus a mixed solution became transparent. The transparent mixed solution was further heated to 100° C. and then stirred at the same temperature for 20 hours to obtain a precursor polymer. From the $^1$H-NMR measurement of this mixed solution, the conversion rate of the monomer was found to be 98%. An average polymerization degree of the polymer was estimated by this conversion rate. As a result, the average polymerization degree of each arm was 115. As a result of the measurement of the molecular weight by GPC, a weight average molecular weight of the polymer was found to be 22,700 and a molecular weight distribution was found to be 1.6.

Using this precursor polymer, polymethyloxazoline was hydrolyzed in the same manner as in Synthesis Example 1 to obtain a star-shaped polyethyleneimine B-PEI in which six polyethyleneimines are bonded to a benzene ring core. As a result of the measurement of $^1$H-NMR (TMS external standard, in heavy water), a peak at 1.98 ppm attributed to a methyl side chain group of the precursor polymer before hydrolysis completely disappeared.

The resulting star-shaped polymethyloxazoline was hydrolyzed in the same manner as in Synthesis Example 1 to obtain a star-shaped polyethyleneimine (B-PEI) in which six polyethyleneimines are bonded to a benzene ring core.

<Star-shaped Polyethyleneimine-Containing Silica Nanofiber (SLP-3)>

In the same manner as in Synthesis Example 1, except that B-PEI synthesized above was used in place of the L-PEI powder in Synthesis Example 1, a hydrogel of a B-PEI association having a concentration of 1% was obtained. The X-ray diffraction measurement of the resulting hydrogel of the P-PEI association was conducted. As a result, it was confirmed that peaks of a scattering intensity appear at 20.3°, 27.3°, and 28.2°. An endothermic peak was confirmed at 55.3° C. by the measurement results of a change in an endothermic state by a calorimeter. The presence of a B-PEI crystal in a hydrogel was confirmed by these measurement results.

In 1 mL of the resulting hydrogel of the B-PEI association, 1 mL of a mixed solution of tetramethoxysilane (TMSO) and ethanol in a mixing ratio of 1/1 (volume ratio) was added, followed by slight stirring of an ice cream-like one for one minute and further standing for 40 minutes. The mixture was washed with excess acetone and then washed three times using a centrifuge. The solid was recovered and dried at room temperature to obtain a B-PEI-containing silica nanofiber structure (SLP-3). As a result of the measurement of X-ray diffraction of the P-PEI-containing silica nanofiber structure (SLP-3), peaks of a scattering intensity appeared at 20.5°, 27.5°, and 28.3°.

The resulting B-PEI-containing silica nanofiber structure (SLP-3) was observed by a scanning electron microscope. As a result, the B-PEI-containing silica nanofiber structure (SLP-3) had a sponge structure composed of assembled fiber-shaped association shapes Synthesis Example 4

Synthesis of Linear Polyethyleneimine-Containing Silica Nanofiber (SLP-4)

<Synthesis of Linear Polyethyleneimine (L-PEI2)>

5 g of a commercially available polyethyloxazoline (number average molecular weight: 500,000, average polymerization degree: 5000, manufactured by Aldrich Co.) was dissolved in 20 mL of an aqueous 5 M hydrochloric acid solution. The solution was hated to 90° C. in an oil bath and then stirred at the same temperature for 10 hours. To the reaction solution, 50 mL of acetone was added, thereby completely dissolving the polymer, followed by filtration and further washing with methanol three times to obtain a white powder of polyethyleneimine. The resulting powder was identified by $^1$H-NMR (heavy water) and it was confirmed that peaks at 1.2 ppm ($CH_3$) and 2.3 ppm ($CH_2$) attributed to an ethyl side chain group of polyethyloxazoline completely disappeared. That is, this fact showed that polyethyloxazoline was completely hydrolyzed and converted into polyethyleneimine.

The powder was dissolved in 5 mL of distilled water and 50 mL of 15% ammonia water was added dropwise to the solution while stirring. After the mixed solution was allowed to stand overnight, the precipitated polymer crystal powder was collected by filtration and the polymer association powder was washed with cold water three times. After washing, the crystal powder was dried in desiccator at room temperature to obtain a linear polyethyleneimine (L-PEI2). The resulting amount was 4.2 g (containing crystal water). Only the side chain of polyethyleneimine obtained by hydrolysis of polyoxazoline changes and the main chain does not change. Therefore, the polymerization degree of L-PEI2 is 5,000 which is the same as that before the hydrolysis.

<Linear Polyethyleneimine-Containing Silica Nanofiber>

A fixed amount of the L-PEI2 powder was weighed and dispersed in distilled water to prepare L-PEI2 dispersion. The dispersion was heated to 90° C. in an oil bath to obtain a completely transparent aqueous solution having a concentration of 3%. The aqueous solution was allowed to stand in an air at room temperature and naturally cooled to room temperature to obtain a hydrogel of an opaque L-PEI2 association.

The X-ray diffraction measurement of the resulting association was conducted. As a result, it was confirmed that peaks of a scattering intensity appear at 20.7°, 27.6°, and 28.4°. An endothermic peak was confirmed at 64.7° C. by the measurement results of a change in an endothermic state by a calorimeter. The presence of a L-PEI2 crystal in a hydrogel was confirmed by these measurement results.

1 mL of the resulting hydrogel of the L-PEI2 association was prepared in the shape of a plate and then added in 10 mL of an aqueous solution (5%) of glutaraldehyde, followed by standing at room temperature for 24 hours to obtain a crosslinked hydrogel. Before crosslinking, the hydrogel is in an ice cream state and the shape is optionally changed by a shear force. However, the crosslinked hydrogel obtained by a chemical crosslinking treatment is converted into a mass and a change in shape due to a shear force did not occur. The resulting plate of the crosslinked hydrogel was immersed in 2 mL of a mixed solution of TMSO and EtOH in a mixing ratio of 1/1 for 24 hours, and then washed by repeatedly immersing in acetone to obtain a plate-shaped structure (SLP-4) of L-PEI2-containing silica nanofiber.

Example 1

L-PEI/Gold/Silica Composite Nanofiber 0.01 g (containing about 3.4 mg of L-PEI) of the L-PEI-containing silica nanofiber structure (SLP-1) obtained in Synthesis Example 1 was immersed in 1 mL of an aqueous solution of gold ions (containing 0.02 g of NaAuCl$_4$) and the mixture was allowed to stand at room temperature for 30 minutes and at 80° C. for 30 minutes, and then washed with distilled water using a centrifuge to obtain a L-PEI/gold/silica composite nanofiber. The L-PEI-containing silica nanofiber structure (SLP-1) showed a white color, but the resulting L-PEI/gold/silica complex nanofiber structure showed a yellow color.

As a result of the measurement of X-ray diffraction of the complex nanofiber structure, sharp scattering peaks attributed to Au were confirmed at 38.1°, 44.4°, 64.5°, and 77.6°.

Figure 2:
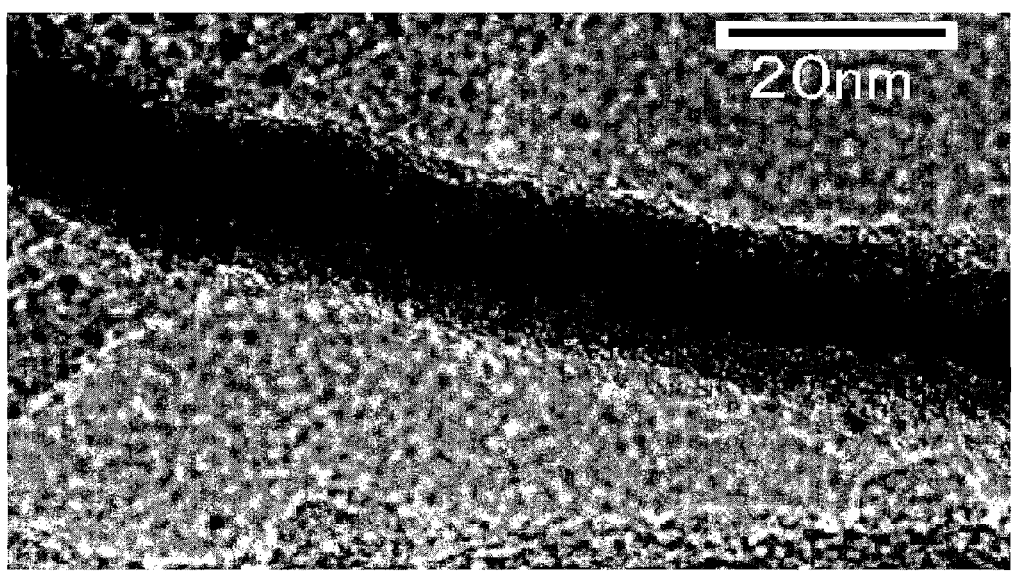
FIG. 2 is a high-resolution transmission electron micrograph of a gold nanowire in a composite nanofiber structure in Example 1 of the present invention.

A transmission electron micrograph of the resulting complex nanofiber structure is shown in FIG. 1, and a high-resolution transmission electron micrograph is shown in FIG. 2. A core-shaped gold nanowire and a silica layer for coating the core-shaped gold nanowire were confirmed by FIG. 2.

Example 2

L-PEI/Platinum/Silica Composite Nanofiber 0.015 g (containing about 5.1 mg of PEI) of the L-PEI-containing silica nanofiber structure (SLP-1) obtained in Synthesis Example 1 was immersed in 1.5 mL of an aqueous solution of platinum ions (containing 0.034 g of Na$_2$PtCl$_4$) and the mixture was allowed to stand at room temperature for 30 minutes and at 80° C. for 30 minutes, and then washed with distilled water using a centrifuge to obtain a L-PEI/platinum/silica composite nanofiber. The L-PEI-containing silica nanofiber structure (SLP-1) showed a white color, but the resulting complex nanofiber structure showed a gray color.

As a result of the measurement of X-ray diffraction of the complex, sharp scattering peaks attributed to Pt were confirmed at 40.0°, 46.4°, and 67.7°.

Figure 3:
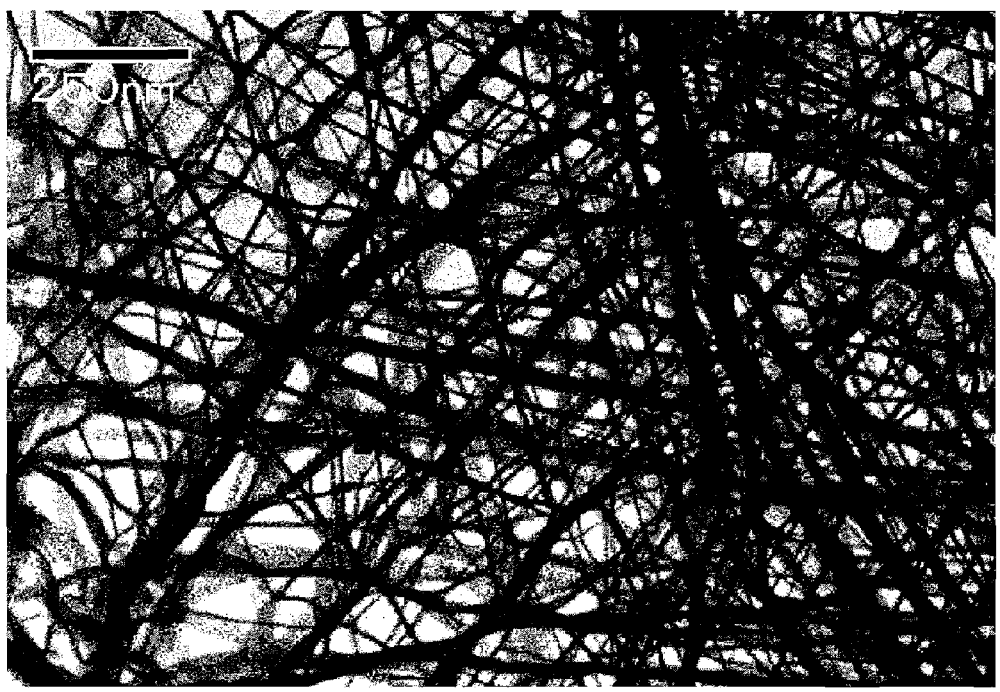
FIG. 3 is a transmission electron micrograph of a composite nanofiber structure in Example 2 of the present invention.
Figure 4:
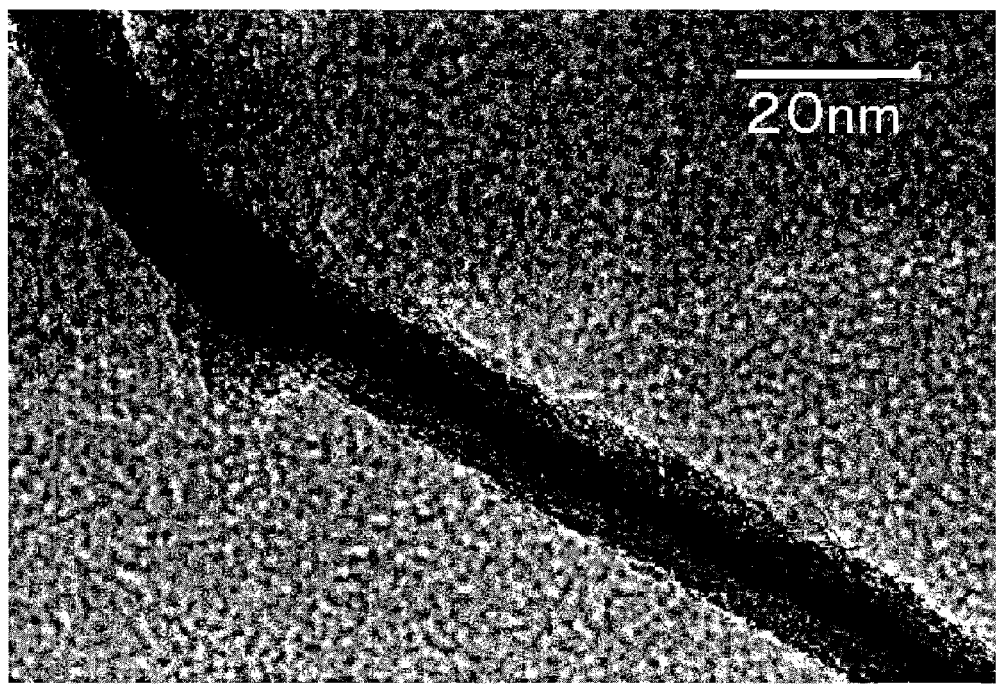
FIG. 4 is a high-resolution transmission electron micrograph of a platinum nanowire in a composite nanofiber structure in Example 2 of the present invention.

A transmission electron micrograph of the resulting complex nanofiber structure is shown in FIG. 3, and a high-resolution transmission electron micrograph is shown in FIG. 4. A core-shaped platinum nanowire and a silica layer for coating the core-shaped platinum nanowire were confirmed by FIG. 4.

Example 3

L-PEI/Palladium/Silica Composite Nanofiber 0.015 g (containing about 5.1 mg of PEI) of the L-PEI-containing silica nanofiber structure (SLP-1) obtained in Synthesis Example 1 was immersed in 1.5 mL of an aqueous solution of palladium ions (containing 0.025 g of Pd(NO$_3$)$_2$) for 1.5 hours and the silica solid was washed with water. After washing, the silica solid was dispersed in 2 mL of water and 1 mL of an aqueous NaBH$_4$ solution (containing 0.02 g of a reducing agent) was added to the dispersion, followed by standing at room temperature for 30 minutes. The solid was washed with distilled water using a centrifuge to obtain a L-PEI/palladium/silica complex nanofiber structure. The L-PEI-containing silica nanofiber structure (SLP-1) showed a white color, but the resulting L-PEI/palladium/silica composite nanofiber showed a deep gray color.

As a result of the measurement of X-ray diffraction of the complex, sharp scattering peaks attributed to Pt were confirmed at 38.8°, 45.6°, and 66.3°.

Example 4

P-PEI/Gold/Silica Composite Nanofiber

Using the P-PEI-containing silica nanofiber structure (SLP-2) obtained in Synthesis Example 2, an aqueous gold ion solution was reduced in the same manner as in Example 1 to obtain a P-PEI/gold/silica complex nanofiber structure.

As a result of the measurement of X-ray diffraction of the complex, sharp scattering peaks attributed to Au were confirmed at 38.0°, 44.6°, 64.7°, and 77.7°.

Figure 5:
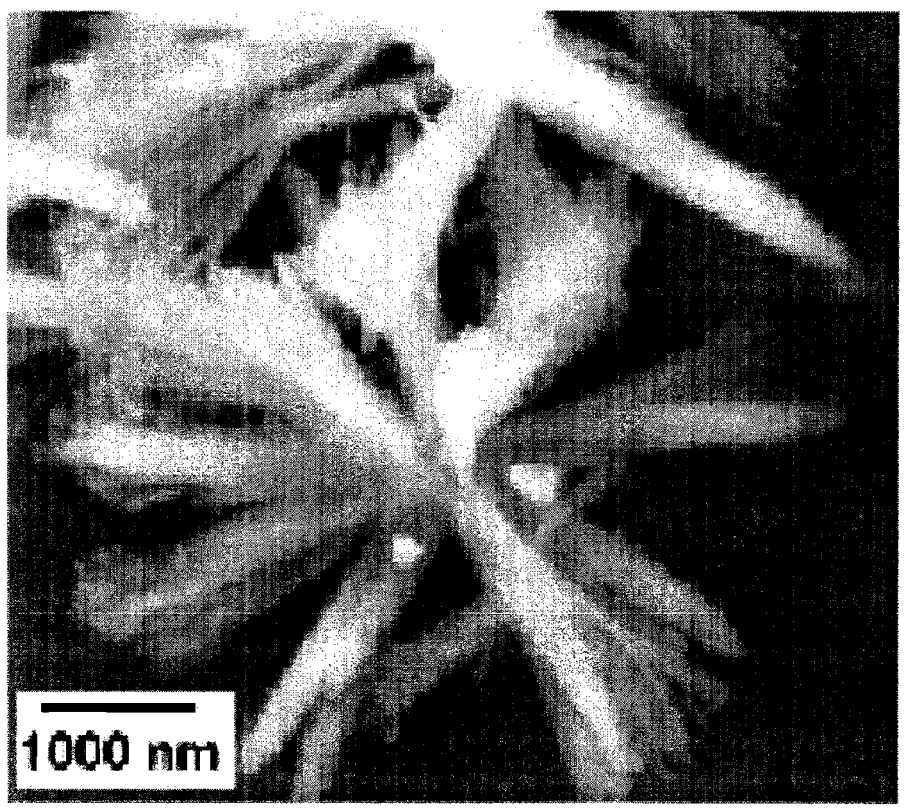
FIG. 5 is a scanning electron micrograph of a composite nanofiber structure in Example 4 of the present invention.

A transmission electron micrograph of the resulting complex nanofiber structure is shown in FIG. 5. A three-dimensional shape of an association in a complex nanofiber structure was confirmed by FIG. 5.

Example 5

B-PEI/Gold/Silica Composite Nanofiber

Using the B-PEI-containing silica nanofiber structure (SLP-3) obtained in Synthesis Example 3, an aqueous gold ion solution was reduced in the same manner as in Example 1 to obtain a B-PEI/gold/silica complex nanofiber structure.

As a result of the measurement of X-ray diffraction of the resulting composite nanofiber association, sharp scattering peaks attributed to Au were confirmed at 38.3°, 44.6°, 64.8°, and 77.7°.

Example 6

L-PEI2/Silver/Silica Composite Nanofiber 0.03 g of the plate-shaped structure (SLP-4) of the L-PEI2-containing silica nanofiber obtained in Synthesis Example 4 was immersed in 4 mL of an aqueous silver nitride solution (1 M) at room temperature for one hour, and then the plate was washed with distilled water to obtain a green L-PEI2/silver/silica complex nanofiber structure. As a result of the measurement of an absorption spectrum of the resulting complex nanofiber structure plate, a plasmon absorption attributed to a nanocrystal of silver was observed at 420 nm. As a result of the measurement of X-ray diffraction, scattering peaks attributed to silver appeared at 38.2, 44.4, 64.6, and 77.5°.

Example 7

L-PEI/Gold-Platinum/Silica Composite Nanofiber 0.02 g (containing about 6.8 mg of PEI) of the L-PEI-containing silica nanofiber structure (SLP-1) obtained in Synthesis Example 1 was immersed in 2 mL of an aqueous mixed solution of gold and platinum ions (containing 0.02 g of $NaAuCl_4$ and 0.023 g of $Na_2PtCl_4$) and the mixture was allowed to stand at room temperature for 30 minutes and at 80° C. for 30 minutes, and then washed with distilled water using a centrifuge. A white color changed to a pale yellow color, and a L-PEI/gold-platinum/silica complex nanofiber structure was obtained. As a result of the measurement of X-ray diffraction of the composite nanofiber structure, scattering peaks attributed to Au and Pt appeared at 38.1, 40.1, 44.2, 46.4, 64.6, 67.7, and 77.6°.

Example 8

L-PEI/Copper Ion/Silica Composite Nanofiber 50 mg (nitrogen: 0.319 mmol) of the L-PEI-containing silica nanofiber structure (SLP-1) obtained in Synthesis Example 1 was weighed and added to 5 mL of an aqueous copper nitrate solution (2 mM). A white structure in the mixture changed to a blue structure. This mixture was allowed to stand for 3 hours, filtered, washed with distilled water three times and then dried to obtain a blue L-PEI/copper ion/silica complex nanofiber structure.

Absorption spectrum measurement of the complex nanofiber structure was conduced. As a result, a strong absorption of a complex formed by a copper nitrogen (Cu—N) coordination appeared at 303 nm and 630 nm.

Example 9

L-PEI/Sodium Ion/Silica Composite Nanofiber 50 mg (nitrogen: 0.319 mmol) of the L-PEI-containing silica nanofiber structure (SLP-1) obtained in Synthesis Example 1 was weighed and added to 5 mL of an aqueous sodium triflate $NaSO_3CF_3$ solution (2 mM). This mixture was allowed to stand for 3 hours, filtered, washed with distilled water three times and then dried to obtain a L-PEI/sodium ion/silica complex nanofiber structure.

As a result of the measurement of WAXS of the L-PEI/sodium ion/silica complex nanofiber structure after drying, a diffraction pattern attributed to L-PEI in the L-PEI-containing silica nanofiber structure (SLP-1) disappeared, while diffraction patterns appeared at 21°, 32°, and 37°. As a result of the observation by DSC, a melting point appeared at 169° C. This fact showed that a complex of L-PEI and sodium ions is formed in a silica nanofiber.

The invention claimed is:

1. A composite nanofiber comprising at least one kind of metal or metal ions and a polymer including straight chain polyethyleneimine backbones in a silica nanofiber, wherein
   a content of the silica is within a range from 30 to 80% by mass, and
   the nanofiber has a thickness within a range from 15 to 100 nm.

2. The composite nanofiber according to claim 1, wherein the at least one kind of metal or metal ions and the polymer including the straight chain polyethyleneimine backbones are coordinatively bonded.

3. The composite nanofiber according to claim 1, wherein the polymer including the straight chain polyethyleneimine backbones is a chain, star-shaped, or comb-shaped polymer.

4. The composite nanofiber according to claim 1, wherein the polymer including the straight chain polyethyleneimine backbones is composed of a block copolymer of a straight chain polyethyleneimine block and the other polymer block.

5. The composite nanofiber according to claim 1, wherein a content of the polyethyleneimine backbones in the polymer including the straight chain polyethyleneimine backbones is 40 mol % or more.

6. The composite nanofiber according to claim 1, wherein the at least one kind of metal or metal ions are at least one kind of metal ions selected from alkali metal ions, alkali earth metal ions, transition metal-based ions, metalloid-based ions, lanthanum-based metal ions, and polyoxometalates.

7. The composite nanofiber according to claim 1, wherein the at least one kind of metal or metal ions are transition metals.

8. The composite nanofiber according to claim 7, wherein the transition metals are at least one kind of metal selected from Au, Ag, Cu, Pt, Pd, Mn, Ni, Rh, Co, Ru, Re, and Mo in the form of a crystal.

9. The composite nanofiber according to claim 7, wherein the transition metals have a nanowire shape or a nanoparticle shape.

10. A composite nanofiber association in which the composite nanofibers according to claim 1 are associated with each other.

11. The composite nanofiber association according to claim 10, wherein the association is a network association.

12. A complex structure in which the composite nanofiber associations according to claim 10 are associated with each other.

13. A method for producing a composite nanofiber, comprising:
(1) dissolving a polymer including a straight chain polyethyleneimine backbone in a solvent, and precipitating the polymer in the presence of water to obtain a crystalline polymer filament of the polymer including the straight chain polyethyleneimine backbone,
(2) bringing the crystalline polymer filament into contact with an alkoxysilane in the presence of water, thereby coating the crystalline polymer filament with silica to obtain a polymercontaining silica nanofiber, and
(3) bringing the polymer-containing silica nanofiber into contact with a solution in which metal ions are dissolved, thereby coordinatively bonding the metal ions to the straight chain polyethyleneimine backbones in the polymer, wherein
the content of the silica is within a range from 30 to 80% by mass, and
the nanofiber has a thickness within a range from 15 to 100 nm.

14. The method for producing a composite nanofiber according to claim 13, wherein the alkoxysilane is a tri- or polyvalent alkoxysilane.

15. The method for producing a composite nanofiber according to claim 13, wherein the amount of the alkoxysilane which is brought into contact with the crystalline polymer filament in the step (2) is 2 to 1000 times as much as that of an ethyleneimine unit of the polymer including the straight chain polyethyleneimine backbones which forms the crystalline polymer filament.

16. The method for producing a composite nanofiber according to claim 13, wherein the alkoxysilane is one or two kinds selected from the group consisting of tetraalkoxysilanes and trialkoxyalkylsilanes.

17. The method for producing a composite nanofiber according to claim 13, wherein the polymer including the straight chain polyethyleneimine backbones is a chain, star-shaped, or comb-shaped polymer.

18. The method for producing a composite nanofiber according to claim 13, wherein the polymer including the straight chain polyethyleneimine backbones is composed of a block copolymer of a straight chain polyethyleneimine block and the other polymer block.

19. The method for producing a composite nanofiber according to claim 13, wherein the content of the polyethyleneimine backbones in the polymer including straight chain polyethyleneimine backbones is 40 mol % or more.

20. The method for producing a composite nanofiber according to claim 13, wherein the metal ions are transition metal ions.

21. The method for producing a composite nanofiber according to claim 20, wherein the transition metal ions are at least one kind of transition metal ions selected from Au, Ag, Cu, Pt, Pd, Mn, Ni, Rh, Co, Ru, Re, and Mo ions.

22. A composite nanofiber according to claim 1 produced by a production method comprising:
(1) dissolving a polymer including a straight chain polyethyleneimine backbone in a solvent, and precipitating the polymer in the presence of water to obtain a crystalline polymer filament of the polymer including the straight chain polyethyleneimine backbone,
(2) bringing the crystalline polymer filament into contact with an alkoxysilane in the presence of water, thereby coating the crystalline polymer filament with silica to obtain a polymercontaining silica nanofiber, and
(3) bringing the polymer-containing silica nanofiber into contact with a solution in which metal ions are dissolved, thereby coordinatively bonding the metal ions to the straight chain polyethyleneimine backbones in the polymer.

* * * * *